United States Patent
Koide

(10) Patent No.: US 12,314,505 B2
(45) Date of Patent: May 27, 2025

(54) DISPLAY DEVICE

(71) Applicant: Japan Display Inc., Tokyo (JP)

(72) Inventor: Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/757,884

(22) Filed: Jun. 28, 2024

(65) Prior Publication Data

US 2024/0353943 A1 Oct. 24, 2024

Related U.S. Application Data

(63) Continuation of application No. 18/239,387, filed on Aug. 29, 2023, now Pat. No. 12,061,758, which is a (Continued)

(30) Foreign Application Priority Data

Jul. 17, 2020 (JP) ................. 2020-123301

(51) Int. Cl.
*G06F 3/041* (2006.01)
*G06F 3/044* (2006.01)
(Continued)

(52) U.S. Cl.
CPC ........ *G06F 3/0412* (2013.01); *G06F 3/04164* (2019.05); *G06F 3/044* (2013.01);
(Continued)

(58) Field of Classification Search
CPC .... G06F 3/0412; G06F 3/04164; G06F 3/044; G02F 1/13338; G09G 3/3614; G09G 2300/0452
See application file for complete search history.

(56) References Cited

U.S. PATENT DOCUMENTS 9,690,420 B2   6/2017  Lee et al.
2008/0180400 A1  7/2008  Kim et al.
(Continued)

FOREIGN PATENT DOCUMENTS

CN   110442255 A   11/2019
JP   2014-045166 A   3/2014
(Continued)

OTHER PUBLICATIONS

Office Action issued in related Japanese Patent Application No. 2020-123301 mailed on Feb. 6, 2024 and English translation of same. 7 pages.

*Primary Examiner* — Peter D McLoone
(74) *Attorney, Agent, or Firm* — K&L Gates LLP

(57) ABSTRACT

A display device includes a plurality of first sub-pixels configured to display red, a plurality of second sub-pixels configured to display green, a plurality of third sub-pixels configured to display blue, and a plurality of fourth sub-pixels configured to display white, a first signal line coupled to the first sub-pixels, a second signal line coupled to the second sub-pixels, and a third signal line coupled to the third sub-pixels and the fourth sub-pixels, a plurality of detection electrodes arrayed in a matrix (row-column configuration) and each provided overlapping the first sub-pixels, the second sub-pixels, the third sub-pixels, and the fourth sub-pixels, and a plurality of signal supply wires coupled to the respective detection electrodes. The signal supply wires are each provided overlapping at least one of the first signal line and the second signal line and not overlapping the third signal line.

12 Claims, 16 Drawing Sheets

Related U.S. Application Data continuation of application No. 17/970,900, filed on Oct. 21, 2022, now Pat. No. 11,782,546, which is a continuation of application No. 17/357,098, filed on Jun. 24, 2021, now Pat. No. 11,675,451.

(51) Int. Cl.
*G02F 1/1333* (2006.01)
*G09G 3/36* (2006.01)

(52) U.S. Cl.
CPC ....... *G02F 1/13338* (2013.01); *G09G 3/3614* (2013.01); *G09G 2300/0452* (2013.01)

(56) References Cited

U.S. PATENT DOCUMENTS

| | | | |
|---|---|---|---|
| 2014/0085222 A1* | 3/2014 | Park | G06F 3/0412 |
| | | | 345/173 |
| 2015/0138463 A1 | 5/2015 | Jinta et al. | |
| 2015/0348489 A1 | 12/2015 | Kabe et al. | |
| 2016/0378239 A1 | 12/2016 | Lee et al. | |
| 2019/0265825 A1* | 8/2019 | Aoki | G02F 1/134309 |
| 2020/0064964 A1 | 2/2020 | Lee | |
| 2020/0301538 A1 | 9/2020 | Aoki et al. | |
| 2020/0333675 A1 | 10/2020 | Morimoto | |

FOREIGN PATENT DOCUMENTS

| | | |
|---|---|---|
| JP | 2015-230343 A | 12/2015 |
| JP | 2019-148855 A | 5/2019 |
| JP | 2019-120902 A | 7/2019 |

\* cited by examiner

DISPLAY DEVICE

CROSS-REFERENCE TO RELATED APPLICATION

This is a continuation of U.S. Application Ser. No. 18/239,387, filed on Aug. 29, 2023, which is a continuation of U.S. Application Ser. No. 17/970,900, filed on Oct. 21, 2022, now U.S. Pat. No. 11,782,546, issued on Oct. 10, 2023, which is a continuation of U.S. Application Ser. No. 17/357,098, filed on Jun. 24, 2021, now U.S. Pat. No. 11,675,451, issued on Jun. 13, 2023, which application claims the benefit of priority from Japanese Patent Application No. 2020-123301 filed on Jul. 17, 2020, the entire contents of which are incorporated herein by reference.

BACKGROUND

1. Technical Field

The present disclosure relates to a display device.

2. Description of the Related Art

Japanese Patent Application Laid-open Publication No. 2019-148855 (JP-A-2019-148855) describes a display device with a sensor including a plurality of detection electrodes arrayed in a matrix (row-column configuration) and a plurality of sensor wires each coupled to one detection electrode. Japanese Patent Application Laid-open Publication No. 2015-230343 (JP-A-2015-230343) describes a display device including sub-pixels that display red, green, and blue and sub-pixels that display white. JP-A-2015-230343 describes column inversion drive as a method for driving the display device.

If slits are formed in a common electrode in the display device described in JP-A-2015-230343 to provide a plurality of detection electrodes as in the technology described in JP-A-2019-148855, what is called crosstalk may possibly occur, resulting in deterioration of display quality. For this reason, it is desired to reduce parasitic capacitance formed between signal lines and detection electrodes (common electrode), and in particular to reduce parasitic capacitance of signal lines commonly coupled to the blue sub-pixels and the white sub-pixels.

SUMMARY

A display device according to an aspect of the present disclosure includes a plurality of first sub-pixels configured to display red, a plurality of second sub-pixels configured to display green, a plurality of third sub-pixels configured to display blue, and a plurality of fourth sub-pixels configured to display white, a first signal line coupled to the first sub-pixels, a second signal line coupled to the second sub-pixels, and a third signal line coupled to the third sub-pixels and the fourth sub-pixels, a plurality of detection electrodes arrayed in a matrix (row-column configuration) and each provided overlapping the first sub-pixels, the second sub-pixels, the third sub-pixels, and the fourth sub-pixels, and a plurality of signal supply wires coupled to the respective detection electrodes. The signal supply wires are each provided overlapping at least one of the first signal line and the second signal line and not overlapping the third signal line.

A display device according to an aspect of the present disclosure includes a plurality of first sub-pixels configured to display red, a plurality of second sub-pixels configured to display green, a plurality of third sub-pixels configured to display blue, and a plurality of fourth sub-pixels configured to display white, a first signal line coupled to the first sub-pixels, a second signal line coupled to the second sub-pixels, and a third signal line coupled to the third sub-pixels and the fourth sub-pixels, a first insulating film provided on the first signal line, the second signal line, and the third signal line, a second insulating film provided on the first insulating film, a signal supply wire provided between the first insulating film and the second insulating film, and a plurality of detection electrodes arrayed in a matrix (row-column configuration) on the second insulating film. The signal supply wire is coupled to the detection electrode through a contact hole formed in the second insulating film in a region overlapping at least one of the first signal line and the second signal line, and a dummy contact hole the bottom surface of which is the first insulating film is formed in the second insulating film in a region overlapping the third signal line.

DETAILED DESCRIPTION

Figure 1:
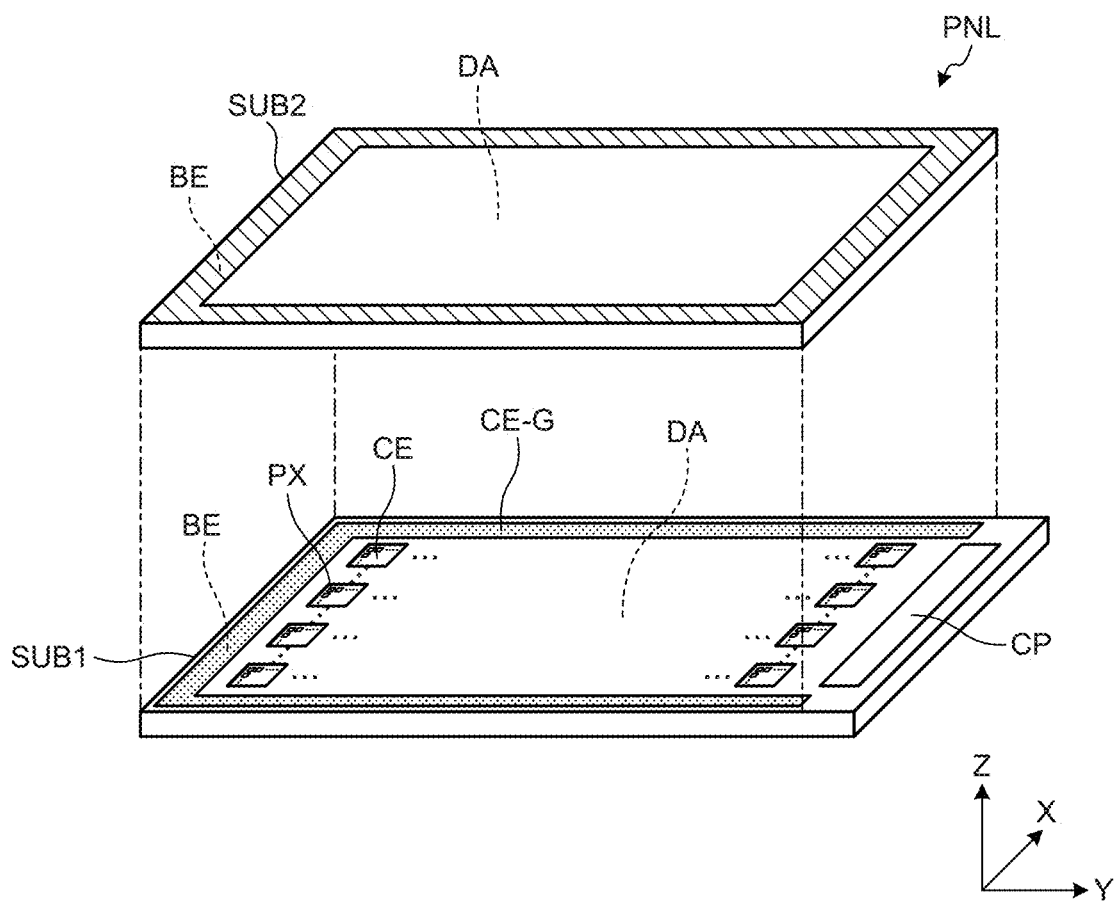
FIG. 1 is an exploded perspective view of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present disclosure and the figures, components similar to those previously described with reference to previous figures are denoted by like reference numerals, and detailed explanation thereof may be appropriately omitted.

To describe an aspect where a first structure is disposed on a second structure in the present specification and the accompanying claims, the term "on" includes both of the following cases unless otherwise noted: a case where the first structure is disposed directly on the second structure in contact with the second structure and a case where the first structure is disposed on the second structure with another structure interposed therebetween.

First Embodiment

FIG. 1 is an exploded perspective view of a display device according to a first embodiment. As illustrated in FIG. 1, a display device PNL includes an array substrate SUB1 and a counter substrate SUB2. As illustrated in FIG. 1, the display device PNL has a peripheral region BE outside a display region DA. While the display region DA has a rectangular shape, the outer shape of the display region DA is not particularly limited. The display region DA may have a cut-out or have another polygonal shape, for example. The display region DA may have another shape, such as a circular or elliptic shape.

A first direction X according to the present embodiment extends along the short side of the display region DA. A second direction Y intersects (or is orthogonal to) the first direction X. The first direction X and the second direction Y are not limited thereto, and the second direction Y may intersect the first direction X at an angle other than 90 degrees. The plane defined by the first direction X and the second direction Y is parallel to the surface of the array substrate SUB1. A third direction Z orthogonal to the first direction X and the second direction Y is the thickness direction of the array substrate SUB1. Planar view indicates the positional relation viewed from the third direction Z.

The display region DA is a region for displaying images and overlaps a plurality of pixels PX. The peripheral region BE is positioned on the inner side than the outer periphery of the array substrate SUB1 and on the outer side than the display region DA. The peripheral region BE may have a frame shape surrounding the display region DA. In this case, the peripheral region BE may also be referred to as a frame region.

The display region DA that displays images includes a sensor region included in a detection device that detects capacitance. As illustrated in FIG. 1, a plurality of detection electrodes CE are arrayed in a matrix (row-column configuration) in the first direction X and the second direction Y in the display region DA. The detection electrodes CE each have a rectangular or square shape schematically in planar view. The shape of the detection electrodes CE will be described later in greater detail. The detection electrodes CE are made of a translucent conductive material, such as indium tin oxide (ITO).

As illustrated in FIG. 1, the peripheral region BE on a first surface of the array substrate SUB1 is provided with outer edge wiring CE-G and an integrated circuit CP. The outer edge wiring CE-G, for example, is provided continuously along the long sides and a short side of the display region DA and surrounds the display region DA.

The display device PNL is a display device with a sensor that integrates the sensor region with the display region DA. Specifically, in the display device PNL, part of members in the display region DA serve as the detection electrodes CE in the sensor region.

Figure 2:
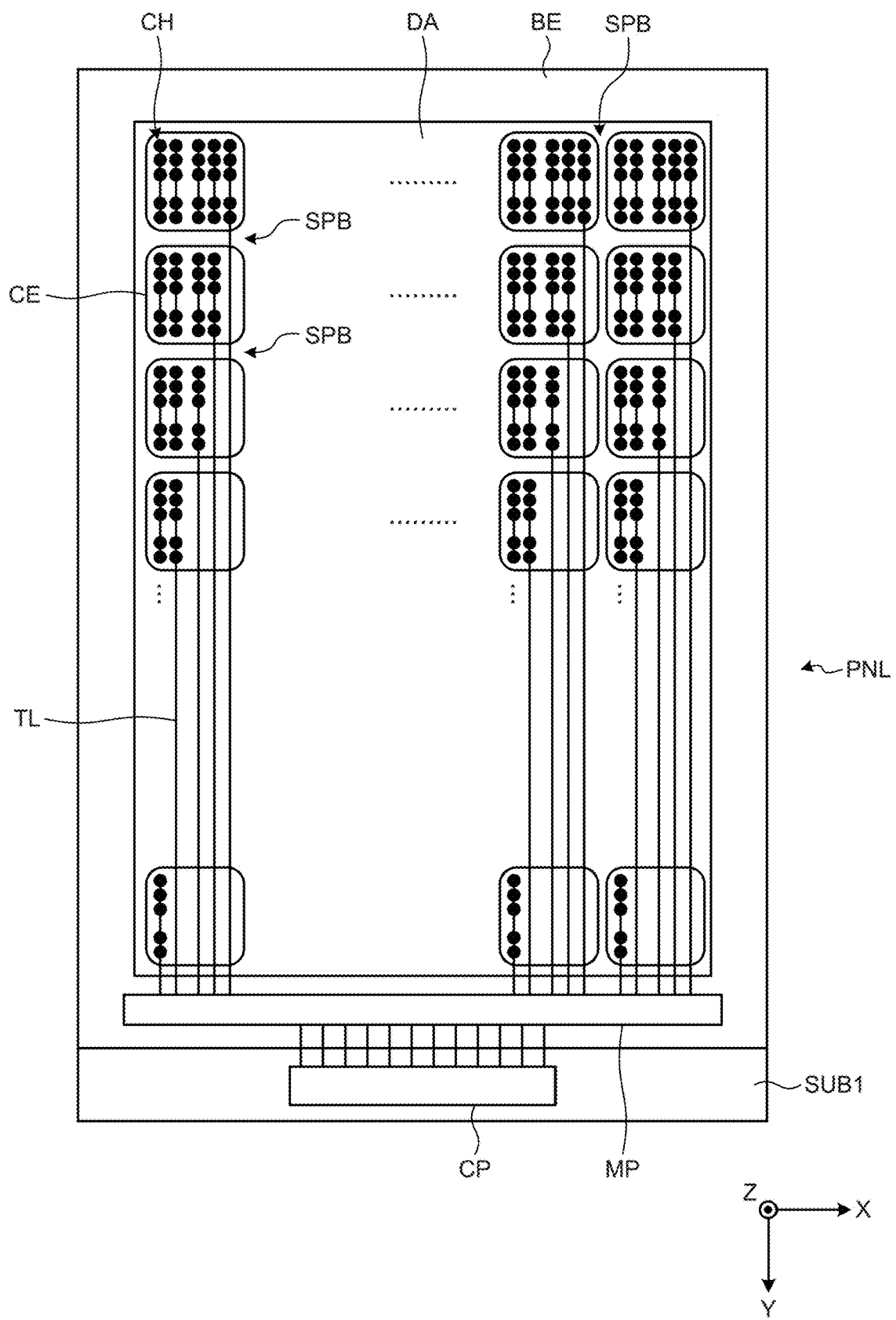
FIG. 2 is a plan view schematically illustrating an array substrate.

FIG. 2 is a plan view schematically illustrating the array substrate. As illustrated in FIG. 2, the detection electrodes CE are divided into a matrix (row-column configuration) in the first direction X and the second direction Y by slits SPB. A coupling circuit MP and the integrated circuit CP are provided on a short side of the peripheral region BE. A wiring substrate, which is not illustrated, is coupled to the short side of the peripheral region BE. The wiring substrate is flexible printed circuits, for example. The positions of the coupling circuit MP and the integrated circuit CP are not limited thereto, and they may be provided on a control substrate or flexible printed circuits outside the module, for example.

The detection electrodes CE are each electrically coupled to the integrated circuit CP via a drive signal supply wire TL and the coupling circuit MP. The drive signal supply wires TL are coupled to the respective detection electrodes CE, supply drive signals to the respective detection electrodes CE in touch detection, and transmit signals corresponding to a capacitance change to analog front ends. Alternatively, the drive signal supply wires TL supply a reference potential VCOM to the respective detection electrodes CE in a display period. The drive signal supply wires TL are electrically coupled to the respective detection electrodes CE disposed in the display region DA and extend to the peripheral region BE. The drive signal supply wires TL extend along the second direction Y and are disposed side by side in the first direction X. A drive circuit incorporated in the integrated circuit CP, for example, is coupled to the detection electrodes CE via the coupling circuit MP disposed in the peripheral region BE and the respective drive signal supply wires TL.

Contact holes CH each have a coupling part at which the detection electrode CE and the drive signal supply wire TL overlapping the detection electrode CE are electrically coupled. In FIG. 2, one drive signal supply wire TL is schematically coupled to one detection electrode CE. In an actual configuration, the drive signal supply wires TL each include a plurality of wires and extend in the display region DA as described later.

The display device PNL further includes the coupling circuit MP. The coupling circuit MP is provided between the detection electrodes CE and the integrated circuit CP. The coupling circuit MP switches coupling and decoupling the detection electrodes CE to be a target of detection drive to and from the integrated circuit CP based on control signals supplied from the integrated circuit CP. The coupling circuit MP is a multiplexer, for example. The integrated circuit CP includes analog front ends.

Figure 3:
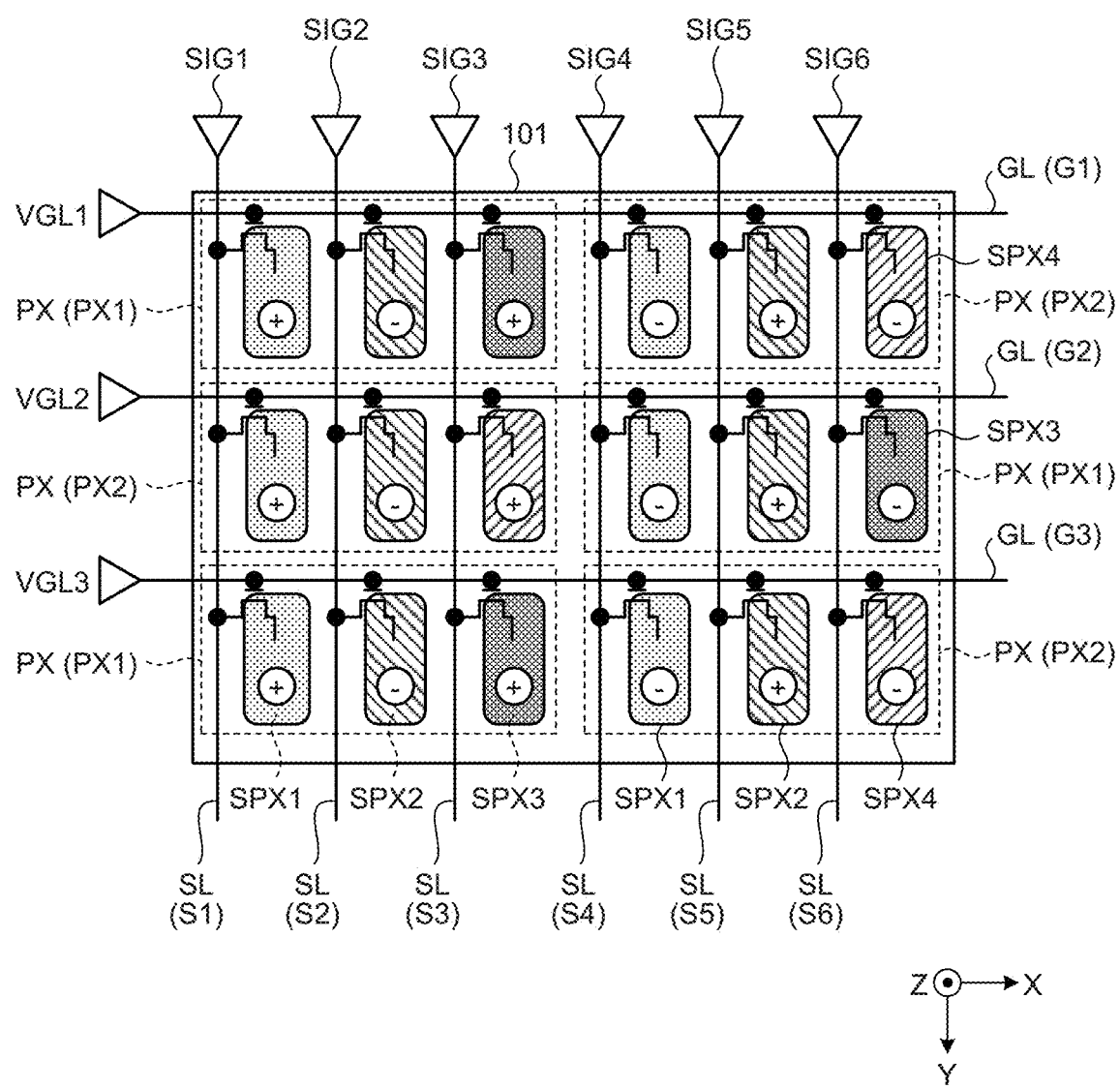
FIG. 3 is a schematic view of a pixel array of the display device according to the first embodiment.

FIG. 3 is a schematic view of a pixel array of the display device according to the first embodiment. As illustrated in FIG. 3, the pixels PX are arrayed in a matrix (row-column configuration). The pixels PX include first sub-pixels SPX1, second sub-pixels SPX2, third sub-pixels SPX3, and fourth sub-pixels SPX4. The first sub-pixel SPX1 displays red as a first primary color. The second sub-pixel SPX2 displays green as a second primary color. The third sub-pixel SPX3 displays blue as a third primary color. The fourth sub-pixel SPX4 displays white. The first sub-pixel SPX1, the second sub-pixel SPX2, the third sub-pixel SPX3, and the fourth sub-pixel SPX4 may be referred to as sub-pixels SPX when they need not be distinguished from one another.

The pixels PX include first pixels PX1 and second pixels PX2. The first pixel PX1 includes the first sub-pixel SPX1, the second sub-pixel SPX2, and the third sub-pixel SPX3. The second pixel PX2 includes the first sub-pixel SPX1, the second sub-pixel SPX2, and the fourth sub-pixel SPX4. The first pixels PX1 and the second pixels PX2 are alternately arrayed in the first direction X and the second direction Y.

More specifically, the first sub-pixels SPX1 are arrayed in the second direction Y. A first sub-pixel column composed of the first sub-pixels SPX1 arrayed in the second direction Y is coupled to common signal lines S1 and S4 (first signal lines). The second sub-pixels SPX2 are arrayed in the second direction Y. A second sub-pixel column composed of the second sub-pixels SPX2 arrayed in the second direction Y is disposed side by side with the first sub-pixel column in the first direction X. The second sub-pixel column is coupled to common signal lines S2 and S5 (second signal lines).

The third sub-pixels SPX3 and the fourth sub-pixels SPX4 are alternately arrayed in the second direction Y. A third sub-pixel column composed of the third sub-pixels SPX3 and the fourth sub-pixels SPX4 arrayed in the second direction Y is disposed side by side with the second sub-pixel column in the first direction X. The third sub-pixel column is coupled to common signal lines S3 and S6 (third signal lines). The first sub-pixel column, the second sub-pixel column, and the third sub-pixel column are repeatedly arrayed in this order in the first direction X.

The first pixels PX1 and the second pixels PX2 arrayed in the first direction X are coupled to scanning lines G1, G2, and G3 row by row. In the following description, the scanning lines G1, G2, and G3 may be collectively referred to as scanning lines GL. The signal lines S1, S2, S3, S4, S5, and S6 may be collectively referred to as signal lines SL.

Figure 4:
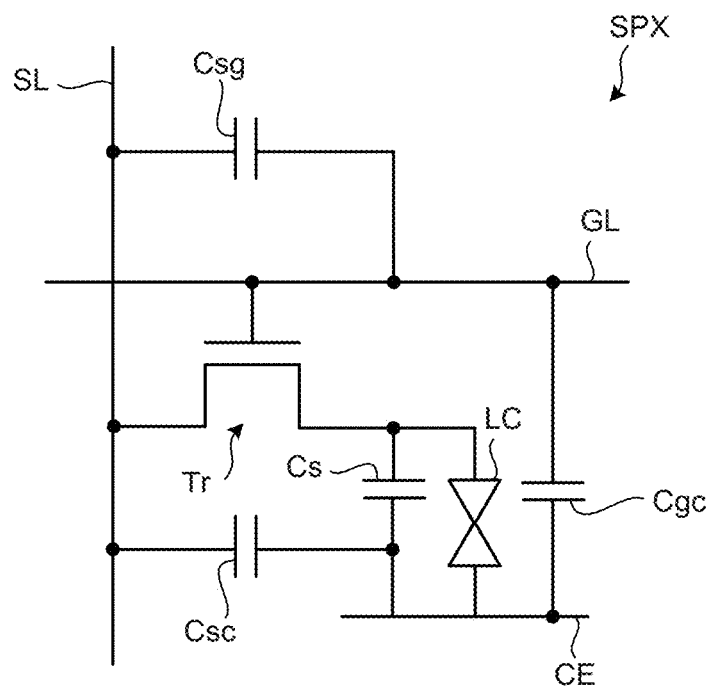
FIG. 4 is an equivalent circuit diagram of a configuration of a pixel.

FIG. 4 is an equivalent circuit diagram of a configuration of a pixel. The array substrate SUB1 is provided with a switching element Tr, a signal line SL, a scanning line GL, and other components for each sub-pixel SPX as illustrated in FIG. 4. The signal line SL is wiring for supplying pixel signals to pixel electrodes PE (refer to FIG. 8) of the respective sub-pixels SPX. The scanning lines G1, G2, and G3 are wiring for supplying gate signals VGL1, VGL2, and VGL3 to drive the switching elements Tr.

As illustrated in FIG. 4, the sub-pixels SPX each include elements, such as the switching element Tr and holding capacitance Cs of a liquid crystal layer LC. The switching element Tr is a thin-film transistor and is an n-channel metal oxide semiconductor (MOS) TFT in this example. An insulating film 16 (refer to FIG. 9) is provided between the pixel electrode PE, which will be described later, and the detection electrode CE, thereby forming the holding capacitance Cs illustrated in FIG. 4.

The gate of the switching element Tr is coupled to the scanning line GL. The source of the switching element Tr is coupled to the signal line SL. The drain of the switching element Tr is coupled to the pixel electrode PE. In the equivalent circuit diagram illustrated in FIG. 4, the drain of the switching element Tr is coupled to one end of the holding capacitance Cs and one end of the capacitance of the liquid crystal layer LC. The other end of the holding capacitance Cs and the other end of the capacitance of the liquid crystal layer LC are coupled to the detection electrode CE.

Moreover, the sub-pixel SPX has parasitic capacitances Csg, Csc, and Cgc. The parasitic capacitance Csg is a capacitance component formed between the scanning line GL and the signal line SL. The parasitic capacitance Csc is a capacitance component formed between the detection electrode CE and the signal line SL. The parasitic capacitance Cgc is a capacitance component formed between the detection electrode CE and the scanning line GL.

Figure 5:
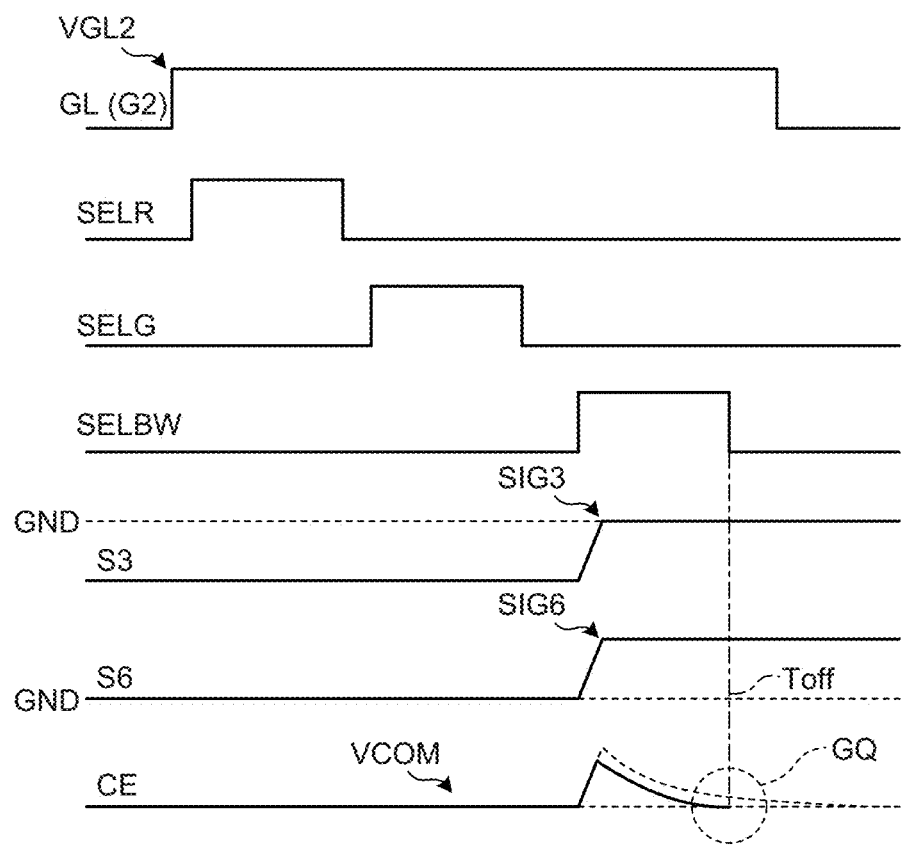
FIG. 5 is a timing waveform chart of an exemplary operation performed by the display devices according to the first embodiment and a comparative example.

The following describes an example of a method for driving the display device PNL according to the present embodiment and a method for driving a display device according to a comparative example with reference to FIGS. 3 to 5. FIG. 5 is a timing waveform chart of an exemplary operation performed by the display devices according to the first embodiment and the comparative example. In FIG. 5, the waveform supplied to the detection electrode CE in the display device PNL according to the first embodiment is indicated by a solid line, and the waveform in the display device according to the comparative example is indicated by a dotted line. For the gate signal VGL, the control signals supplied to selectors SELR, SELG, and SELB, and the pixel signal SIG, the following describes a case in which common signals are supplied to the display devices according to the first embodiment and the comparative example.

The method for driving the display device PNL according to the present embodiment and the display device according to the comparative example is column inversion drive. Column inversion drive is a driving method of alternately applying voltages having reverse polarities to units of one line (column) of sub-pixels or pixels composed of sub-pixels and inverting the polarities of the applied voltages in a predetermined cycle.

To display video in an n−1-th period, for example, the signal lines SL1, SL3, and SL5 are supplied with the pixel signals SIG1, SIG3, and SIG5, respectively, corresponding to a minus voltage with respect to the reference potential VCOM. The signal lines SL2, SL4, and SL6 are supplied with the pixel signals SIG2, SIG4, and SIG6, respectively, corresponding to a plus voltage with respect to the reference potential VCOM.

To display video in an n-th period, the signal lines SL1, SL3, and SL5 are supplied with the pixel signals SIG1, SIG3, and SIG5, respectively, corresponding to a plus voltage with respect to the reference potential VCOM as illustrated in FIG. 3. The signal lines SL2, SL4, and SL6 are supplied with the pixel signals SIG2, SIG4, and SIG6, respectively, corresponding to a minus voltage with respect to the reference potential VCOM.

In the following description, the third sub-pixels SPX3 out of the sub-pixels SPX included in a region 101 illustrated in FIG. 3 are supplied with the pixel signals SIG for displaying blue, and the other sub-pixels SPX are supplied with a voltage GND for displaying black. The sub-pixels SPX included in the display region DA other than the region 101 are supplied with the pixel signals SIG for displaying gray video. In the following description, the region including the sub-pixels SPX other than the region 101 is referred to as a background part. The voltage applied to the sub-pixels SPX to display the gray video in the background part is referred to as a voltage for displaying halftone video, for example.

As illustrated in FIG. 5, the gate signal VGL2 is supplied to the scanning line G2. In a period when the gate signal VGL2 is turned on, the selectors SELR, SELG, and SELBW are each supplied with a pulse signal. The selectors SELR, SELG, and SELBW are switching elements included in the coupling circuit MP (refer to FIG. 1). For example, when the pulse signal is turned on, the selector SELR selects the signal lines S1 and S4 and supplies the pixel signals SIG1 and SIG4, respectively, to the first sub-pixels SPX1 coupled to the signal lines S1 and S4. When the pulse signal is turned on, the selector SELG selects the signal lines S2 and S5 and supplies the pixel signals SIG2 and SIG5, respectively, to the second sub-pixels SPX2 coupled to the signal lines S2 and S5. When the pulse signal is turned on, the selector SELBW selects the signal lines S3 and S6 and supplies the pixel signals SIG3 and SIG6, respectively, to the third sub-pixels SPX3 and the fourth sub-pixels SPX4 coupled to the signal lines S3 and S6.

As illustrated in FIG. 5, when the selector SELBW is supplied with the pulse signal, the electric potential of the signal line S3 increases from a minus potential to an electric potential GND. As a result, the signal line S3 supplies the white pixel signal SIG3 corresponding to the electric potential GND to the fourth sub-pixel SPX4 selected by the scanning line G2. The minus potential supplied in a period before the fourth sub-pixel SPX4 is selected by the selector SELBW is an electric potential corresponding to the blue pixel signal SIG supplied to the third sub-pixel SPX3 selected by the previous scanning line G1.

When the selector SELBW is supplied with the pulse signal, the electric potential of the signal line S6 increases from the electric potential GND to a plus potential. As a result, the signal line S6 supplies the blue pixel signal SIG6 corresponding to the plus potential to the third sub-pixel SPX3 selected by the scanning line G2. The electric potential GND supplied in a period before the third sub-pixel SPX3 is selected by the selector SELBW is an electric potential corresponding to the white pixel signal SIG supplied to the fourth sub-pixel SPX4 selected by the previous scanning line G1.

In other words, both of the electric potentials supplied to the signal lines S3 and S6 increase. As described above, the signal line SL and the detection electrode CE are capacitively coupled by the parasitic capacitance Csc (refer to FIG. 4). With the increase in the electric potential of the signal lines S3 and S6, the electric potential of the detection electrode CE increases. The drive signal supply wires TL illustrated in FIG. 2 are electrically coupled to the detection electrodes CE. As a result, the electric potentials of the detection electrodes CE and the drive signal supply wires TL increase in the background part other than the region 101 supplied with the pixel signals SIG3 and SIG6.

As illustrated in FIG. 5, the electric potential of the detection electrode CE decreases over time in accordance with the time constant of the detection electrode CE and the drive signal supply wire TL and converges to the original potential. In the display device according to the comparative example having larger parasitic capacitance Csc, the voltage of the crosstalk component does not converge by time Toff when the pulse signal supplied to the selector SELBW is turned off as indicated by the dotted line GQ in FIG. 5. The difference in voltage generated in the detection electrode CE increases the effective voltage of the fourth sub-pixel SPX4. As a result, an image not supposed to be generated may possibly be displayed in the background part. The fluctuations in luminance of the fourth sub-pixel SPX4 tend to be more influential than the fluctuations in luminance of the other sub-pixels SPX.

When the display device PNL is driven at high speed, that is, if the pulse width of the pulse signal supplied to the selector SELBW is reduced, the difference in voltage at time Toff increases, thereby increasing the possibility of deteriorating the display quality.

The present embodiment reduces the parasitic capacitance Csc between the signal line SL and the detection electrode CE, thereby allowing the reduction of the time constant of the detection electrode CE and the drive signal supply wire TL. As a result, the electric potential of the detection electrode CE converges to the original potential faster than the conventional example, thereby reducing the potential difference generated in the detection electrode CE at time Toff. Consequently, the present embodiment can reduce the potential difference of the crosstalk component and suppress deterioration of display quality.

The timing waveform chart illustrated in FIG. 5 is given by way of example only, and the present embodiment is not limited to the example illustrated in FIG. 5.

Figure 6:
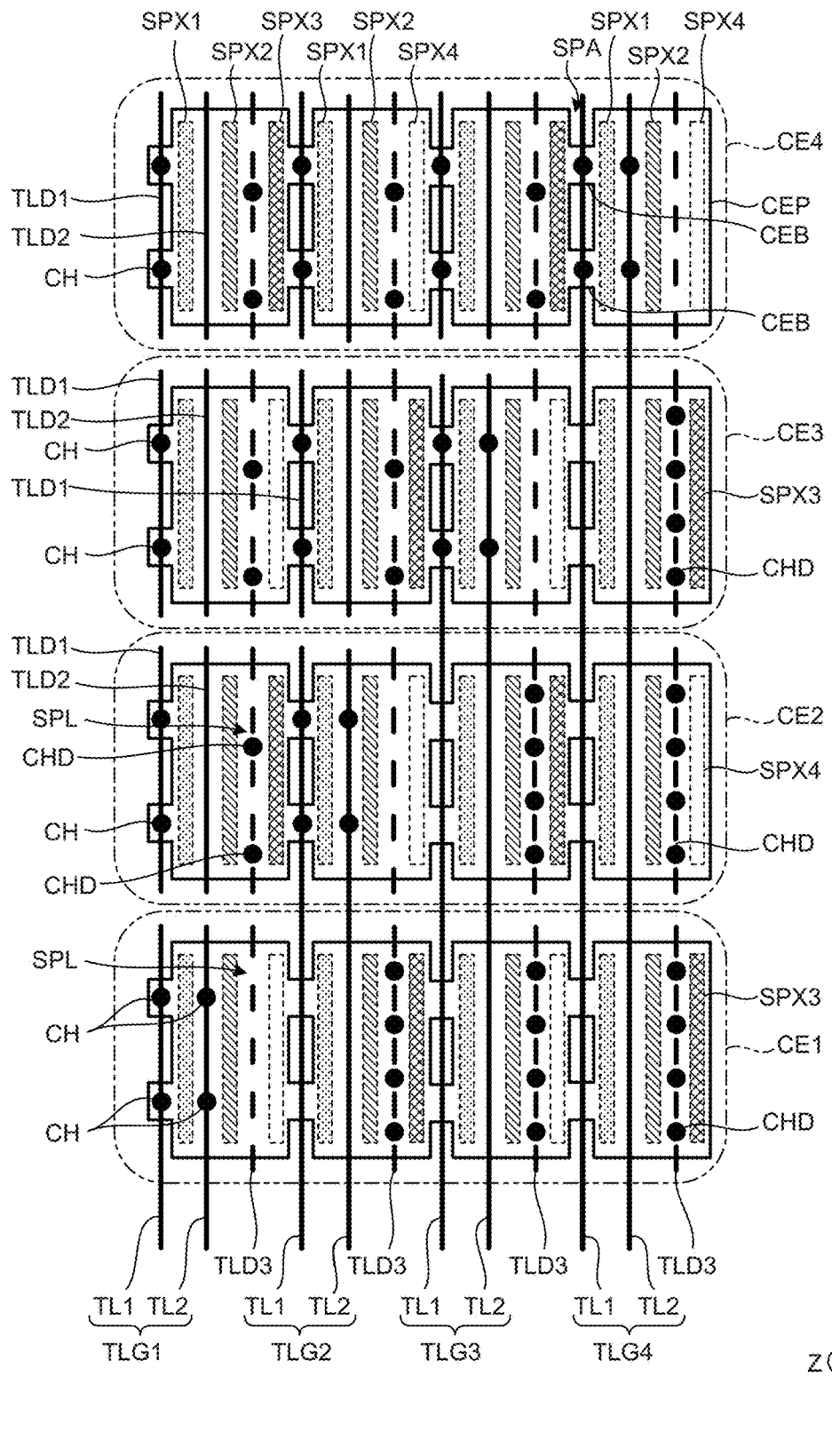
FIG. 6 is a view for explaining the relation between a plurality of detection electrodes, a plurality of drive signal supply wires, and a plurality of dummy wires.

The following describes a specific configuration that reduces the time constant of the detection electrode CE and the drive signal supply wire TL. FIG. 6 is a view for explaining the relation between a plurality of detection electrodes, a plurality of drive signal supply wires, and a plurality of dummy wires.

As illustrated in FIG. 6, detection electrodes CE1, CE2, CE3, and CE4 are arrayed in the second direction Y. The detection electrodes CE1, CE2, CE3, and CE4 are each provided overlapping a plurality of sub-pixels SPX (a plurality of first sub-pixels SPX1, a plurality of second sub-pixels SPX2, a plurality of third sub-pixels SPX3, and a plurality of fourth sub-pixels SPX4). To simplify the drawing, the detection electrodes CE each overlap one row of the sub-pixels SPX in FIG. 6. In an actual configuration, one detection electrode CE is disposed overlapping a plurality of rows of the sub-pixels SPX.

In the following description, the detection electrodes CE1, CE2, CE3, and CE4 are referred to as the detection electrodes CE when they need not be distinguished from one another. The detection electrodes CE each include a main detection electrode CEP and sub-detection electrodes CEA and CEB (refer to FIG. 7 for the sub-detection electrode CEA). A slit SPA is formed between the main detection electrodes CEP disposed side by side in the first direction X. The configuration of the detection electrode CE will be described later in detail.

A drive signal supply wire TL1 is provided corresponding to the first sub-pixel column composed of a plurality of first sub-pixels SPX1. A drive signal supply wire TL2 is provided corresponding to the second sub-pixel column composed of a plurality of second sub-pixels SPX2. The drive signal supply wires TL1 and TL2 are each coupled to the detection electrode CE through the contact holes CH. In the following description, the drive signal supply wires TL1 and TL2 are simply referred to as the drive signal supply wires TL when they need not be distinguished from each other.

More specifically, a pair of drive signal supply wires TL1 and TL2 disposed side by side in the first direction X is referred to as a wiring group TLG. Wiring groups TLG1, TLG2, TLG3, and TLG4 are arrayed in the first direction X and are coupled to the detection electrodes CE1, CE2, CE3, and CE4, respectively. The length of the wiring groups TLG1, TLG2, TLG3, and TLG4 in the second direction Y becomes longer in this order. The wiring group TLG1 coupled to the detection electrode CE1 does not overlap the detection electrode CE2, CE3, or CE4. The wiring group TLG2 coupled to the detection electrode CE2 does not overlap the detection electrode CE3 or CE4. The wiring group TLG3 coupled to the detection electrode CE3 does not overlap the detection electrode CE4.

Two drive signal supply wires TL1 and TL2 are coupled to one detection electrode CE. The drive signal supply wire TL1 is coupled to the detection electrode CE through two contact holes CH. The drive signal supply wire TL2 is coupled to the detection electrode CE through two contact holes CH. In FIG. 6, the detection electrode CE is electrically coupled to the drive signal supply wires TL1 and TL2 through a total of four contact holes CH. The present embodiment is not limited thereto, and at least one drive signal supply wire TL may be provided. One contact hole CH or three or more contact holes CH may be formed for one drive signal supply wire TL.

The display device PNL further includes first dummy wires TLD1, second dummy wires TLD2, and third dummy wires TLD3. The first dummy wires TLD1 are provided corresponding to the first sub-pixel column composed of a plurality of first sub-pixels SPX1. The first dummy wires TLD1 are disposed side by side with the drive signal supply wire TL1 in the second direction Y. The second dummy wires TLD2 are provided corresponding to the second sub-pixel column composed of a plurality of second sub-pixels SPX2. The second dummy wires TLD2 are disposed side by side with the drive signal supply wire TL2 in the second direction Y.

In the sub-pixel column provided with the wiring group TLG1, the first dummy wires TLD1 and the second dummy wires TLD2 are disposed overlapping the detection electrodes CE2, CE3, and CE4 in a manner separated from one another corresponding to the respective detection electrodes CE2, CE3, and CE4. In the sub-pixel column provided with the wiring group TLG2, the first dummy wires TLD1 and the second dummy wires TLD2 are disposed overlapping the detection electrodes CE3 and CE4 in a manner separated from each other corresponding to the respective detection electrodes CE3 and CE4. In the sub-pixel column provided with the wiring group TLG3, the first dummy wire TLD1 and the second dummy wire TLD2 are disposed overlapping the detection electrode CE4.

The third dummy wires TLD3 are provided corresponding to the third sub-pixel column composed of a plurality of third sub-pixels SPX3 and a plurality of fourth sub-pixels SPX4. The third dummy wires TLD3 are disposed side by side with the drive signal supply wires TL1 and TL2 in the first direction X. Alternatively, the third dummy wires TLD3 are disposed side by side with the first dummy wire TLD1 and the second dummy wire TLD2 in the first direction X.

The length of the third dummy wire TLD3 in the second direction Y is shorter than that of the first dummy wire TLD1 and the second dummy wire TLD2 in the second direction Y. For example, the first dummy wires TLD1 and the second dummy wires TLD2 are provided in a manner separated from one another corresponding to the respective detection electrodes CE arrayed in the second direction Y, and the third dummy wires TLD3 are provided in a manner separated from one another corresponding to the respective sub-pixels SPX or the respective pixels PX arrayed in the second direction Y.

The first dummy wire TLD1 according to the present embodiment is electrically coupled to the detection electrode CE through the contact holes CH and is supplied with the same potential as that of the detection electrode CE. The number of contact holes CH formed for one first dummy wire TLD1 is equal to that of contact holes CH formed for one drive signal supply wire TL1.

No contact hole CH is formed for the second dummy wire TLD2, and the second dummy wire TLD2 is not coupled to the detection electrode CE. The second dummy wire TLD2 is in a floating state of not being supplied with signals, such as drive signals and the reference potential VCOM. The third dummy wire TLD3 is also in a floating state of not being coupled to the detection electrode CE.

Dummy contact holes CHD are each formed between the third dummy wires TLD3 disposed side by side in the second direction Y. The dummy contact holes CHD are formed in a manner not coupled to various wiring, such as the third dummy wires TLD3 and the signal lines SL. Let us focus on the detection electrode CE2, for example. In the region corresponding to the leftmost pixel PX, two dummy contact holes CHD are formed for the third dummy wire TLD3 disposed side by side with the first dummy wire TLD1 and the second dummy wire TLD2. In the pixel PX where the contact holes CH are formed for each of the drive signal supply wires TL1 and TL2 of the wiring group TLG2, no dummy contact hole CHD is formed for the third dummy wire TLD3 disposed side by side with the drive signal supply wires TL1 and TL2. In the pixels PX overlapping the wiring groups TLG3 and TLG4 and where no contact hole CH is formed, four dummy contact holes CHD are formed for the third dummy wire TLD3 disposed side by side with the drive signal supply wires TL1 and TL2.

As described above, the dummy contact holes CHD are formed so as to reduce the difference in the total number of contact holes CH and dummy contact holes CHD in each predetermined region (e.g., the main detection electrode CEP). This configuration can suppress variations in arrangement density of the contact holes CH and the dummy contact holes CHD and suppress deterioration of display quality.

The number of contact holes CH formed for the first dummy wire TLD1 and the number of dummy contact holes CHD formed for the third dummy wire TLD3 may be appropriately changed. The number of contact holes CH formed for the first dummy wire TLD1, for example, may be different from that of contact holes CH formed for the drive signal supply wire TL1. The dummy contact holes CHD may be formed for the third dummy wire TLD3 also in the main detection electrode CEP where the contact holes CH are formed for the drive signal supply wires TL1 and TL2.

Figure 7:
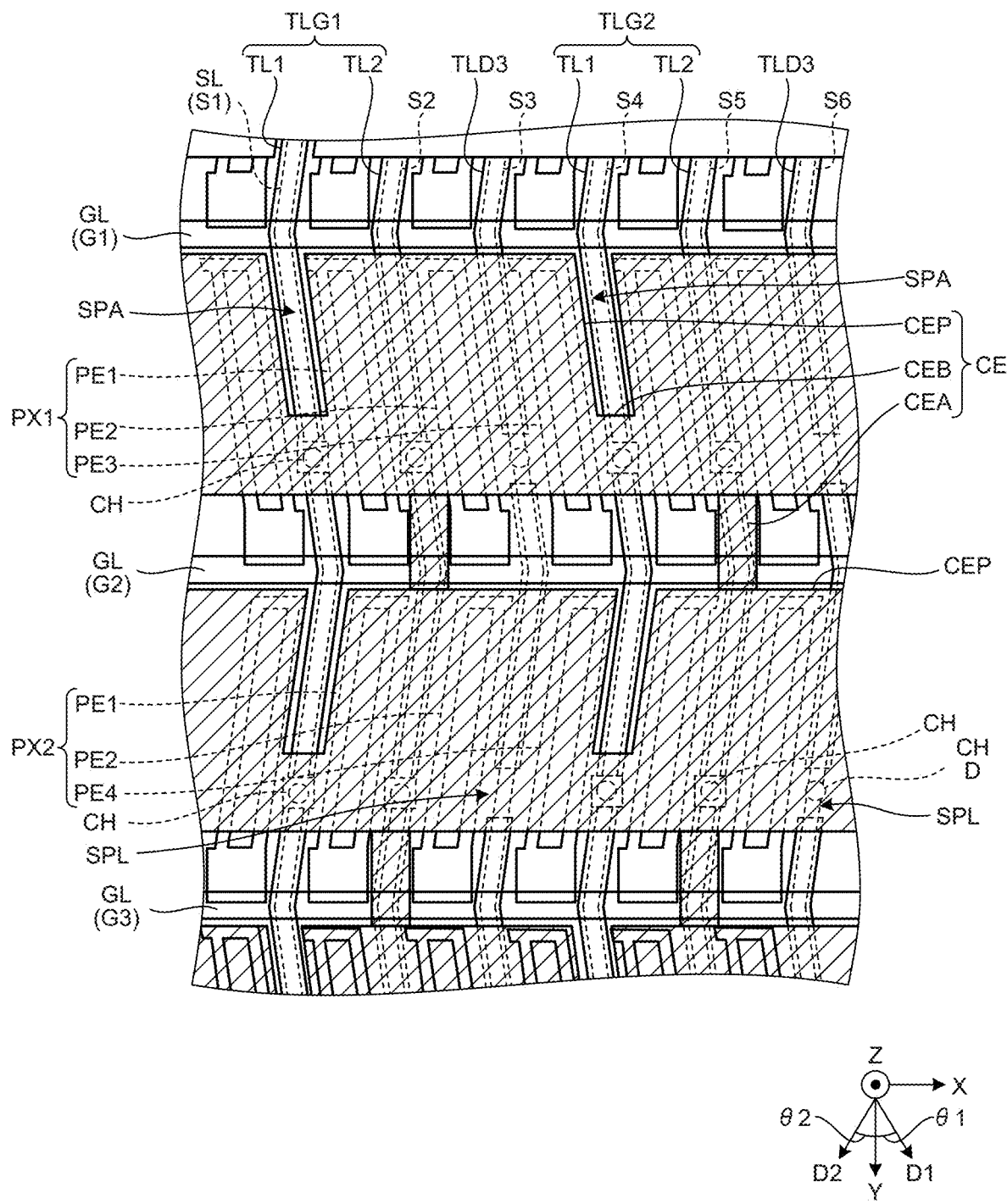
FIG. 7 is a plan view for explaining the detection electrodes in a schematic plan view of the pixels.
Figure 8:
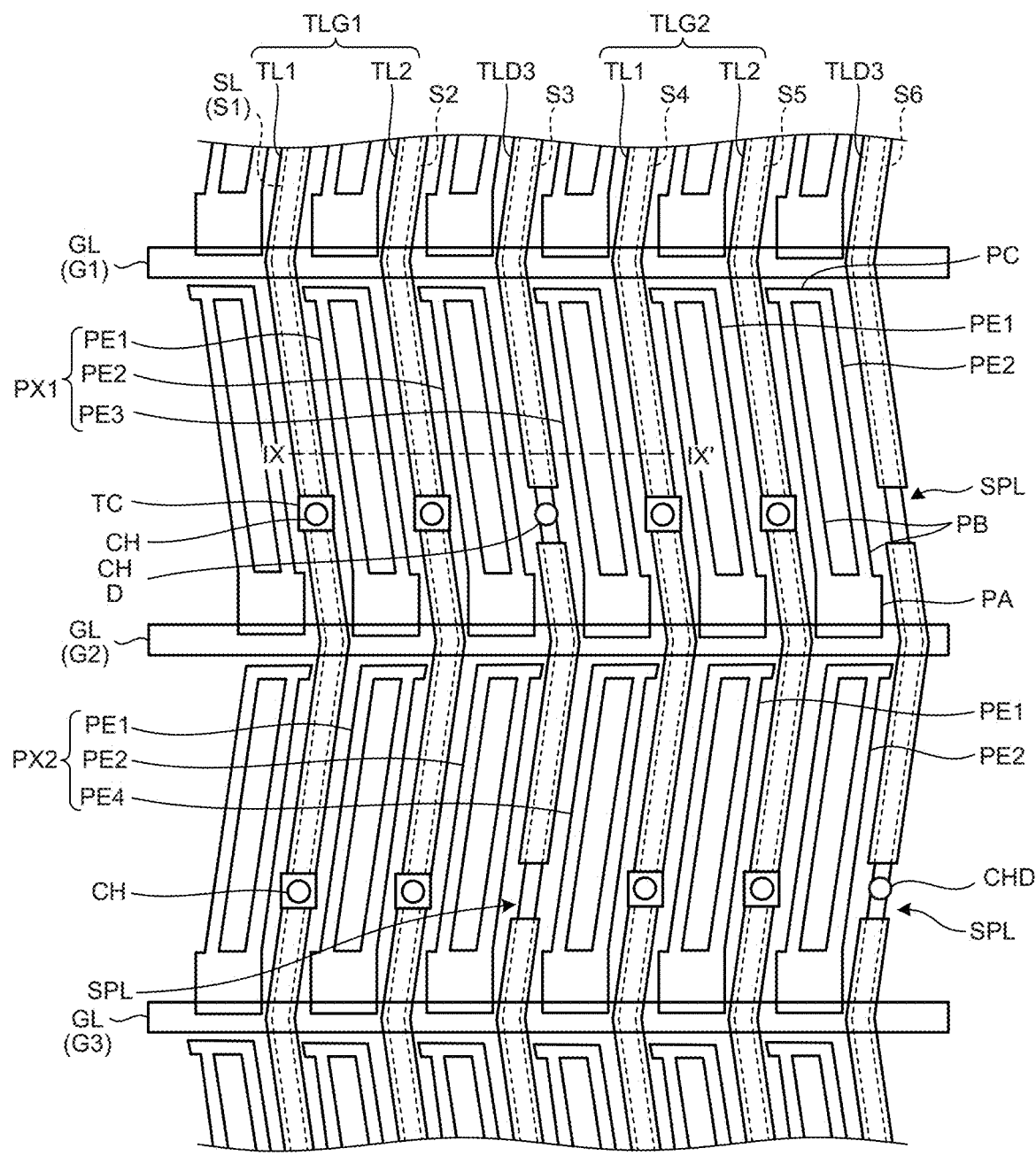
FIG. 8 is a plan view for explaining the drive signal supply wires and the dummy wires in a schematic plan view of the pixels.
Figure 9:
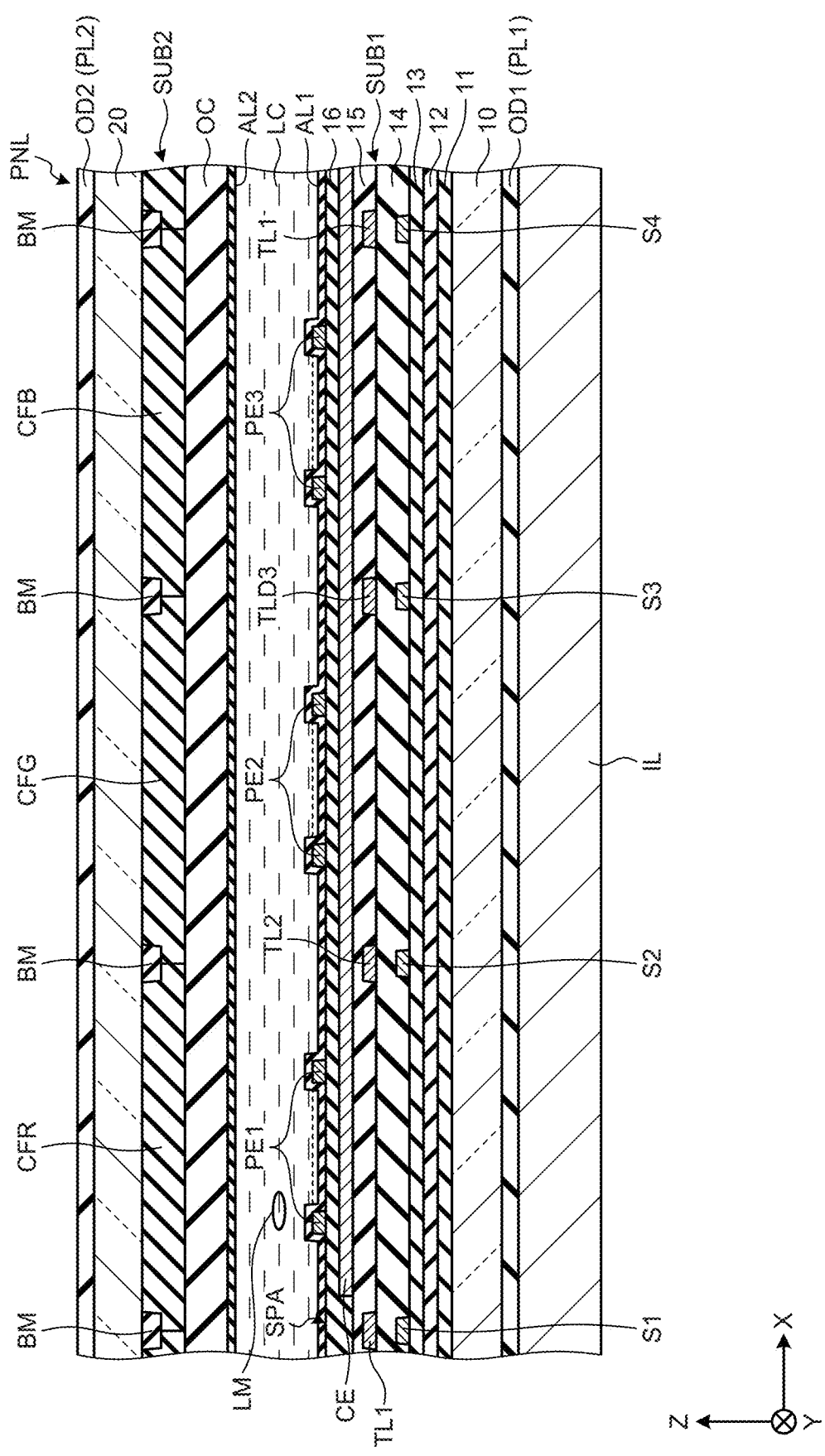
FIG. 9 is a sectional view along line IX-IX' of FIG. 8.
Figure 10:
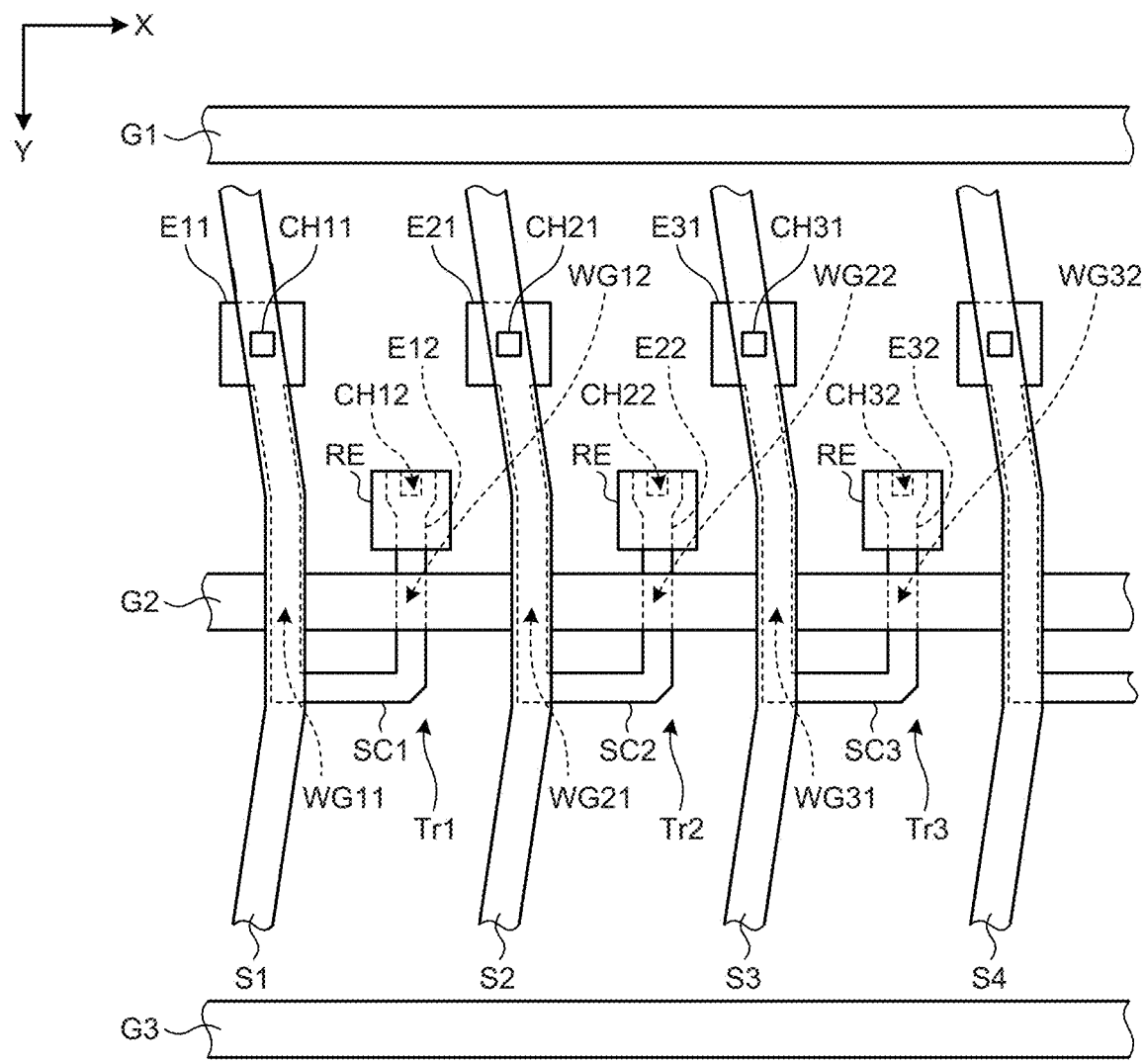
FIG. 10 is a plan view for explaining switching elements according to the first embodiment.

The following describes the configuration of the sub-pixels SPX in greater detail. FIG. 7 is a plan view for explaining the detection electrodes in a schematic plan view of the pixels. FIG. 8 is a plan view for explaining the drive signal supply wires and the dummy wires in a schematic plan view of the pixels. FIG. 9 is a sectional view along line IX-IX' of FIG. 8. FIG. 10 is a plan view for explaining the switching elements according to the first embodiment.

As illustrated in FIG. 9, the signal lines S1, S2, and S3, pixel electrodes PE1, PE2, and PE3, the detection electrodes CE, and the drive signal supply wires TL1, TL2, and TLD are provided above a first insulating substrate 10. In the following description, the pixel electrodes PE1, PE2, and PE3 may be collectively referred to as the pixel electrodes PE.

As illustrated in FIG. 7, the scanning lines G1, G2, and G3 extend along the first direction X and are disposed side by side at regular pitches in the second direction Y. While the scanning lines G1, G2, and G3 are not illustrated in FIG. 9, they are also provided above the first insulating substrate 10.

In FIGS. 7 and 8, D1 is defined as a direction intersecting the second direction Y counter-clockwisely at an acute angle, and D2 is defined as a direction intersecting the second direction Y clockwisely at an acute angle. An angle θ1 between the second direction Y and the direction D1 is substantially equal to an angle θ2 between the second direction Y and the direction D2. The signal lines S1, S2, and S3 extend approximately along the second direction Y and are disposed side by side at regular pitches in the first direction X. In the illustrated example, the signal lines S1, S2, and S3 extend in the direction D1 between the scanning line G1 and the scanning line G2 and in the direction D2 between the scanning line G2 and the scanning line G3. The scanning lines G1, G2, and G3 and the signal lines S1, S2, and S3 intersect each other in a planar view.

As illustrated in FIG. 10, the switching element Tr1 is positioned near the intersection of the scanning line G2 and the signal line S1 and electrically coupled to the scanning line G2 and the signal line S1. The switching element Tr2 is positioned near the intersection of the scanning line G2 and the signal line S2 and electrically coupled to the scanning line G2 and the signal line S2. The switching element Tr3 is positioned near the intersection of the scanning line G2 and the signal line S3 and electrically coupled to the scanning line G2 and the signal line S3.

As illustrated in FIG. 8, the pixel electrodes PE1, PE2, and PE3 are disposed side by side in the first direction X with a gap interposed therebetween. The pixel electrode PE1 is positioned between two signal lines SL. The pixel electrodes PE1, PE2, and PE4 are disposed side by side with the pixel electrodes PE1, PE2, and PE3, respectively, in the second direction Y with a gap interposed therebetween. The pixel electrode PE1 is positioned between two scanning lines GL. The pixel electrodes PE1, PE2, PE3, and PE4 are each provided in a region surrounded by two signal lines SL and two scanning lines GL.

Each of the pixel electrodes PE has a contact part PA, electrode parts PB, and a connecting part PC. The contact part PA is electrically coupled to the switching element Tr (refer to FIG. 10). The electrode part PB extends from the contact part PA to the side closer to the scanning line G1 from the scanning line G2. The electrode part PB may also be referred to as a strip electrode, a linear electrode, or a comb electrode, for example. In FIG. 8, one pixel electrode PE includes two electrode parts PB. The two electrode parts PB are coupled to the contact part PA. The electrode parts PB are disposed side by side in the first direction X with a gap interposed therebetween. The connecting part PC is connected to the ends of the two electrode parts PB.

The shape of the pixel electrode PE is not limited to that in the example illustrated in FIG. 8. The pixel electrode PE does not necessarily have the connecting part PC, and the number of electrode parts PB may be not two but three or four, for example.

The pixel electrodes PE1, PE2, PE3, and PE4 have substantially the same shape. In the pixel electrodes PE1, PE2, and PE3 arrayed in the first direction X, for example, all the electrode parts PB extend in the same direction parallel to the direction D1. In the pixel electrodes PE1, PE2, and PE4 arrayed in the first direction X, all the electrode parts PB extend in the same direction parallel to the direction D2. The pixel electrodes PE1, PE2, PE3, and PE4 do not necessarily have the same shape and may have different shapes and areas.

As illustrated in FIG. 7, the detection electrode CE includes the main detection electrode CEP, the sub-detection electrode CEA, and the sub-detection electrode CEB. The main detection electrodes CEP are provided over substantially the whole display region DA (refer to FIG. 1) of the array substrate SUB1. In other words, the first pixel PX1 includes the pixel electrodes PE1, PE2, and PE3, and the main detection electrode CEP (detection electrode CE) is provided in a region overlapping the pixel electrodes PE1, PE2, and PE3. Alternatively, the second pixel PX2 includes the pixel electrodes PE1, PE2, and PE4, and the main detection electrode CEP (detection electrode CE) is provided in a region overlapping the pixel electrodes PE1, PE2, and PE4.

The following describes the configuration of the first pixel PX1, and overlapping explanation of the second pixel PX2 is omitted. The main detection electrode CEP overlaps the pixel electrodes PE1, PE2, and PE3, the signal lines S1, S2, and S3, the drive signal supply wires TL1 and TL2, and the third dummy wire TLD3, but does not overlap the scanning lines G1, G2, and G3 in planar view.

As illustrated in FIG. 7, the sub-detection electrode CEA extends in the second direction Y and electrically couples the main detection electrodes CEP disposed side by side in the second direction Y. The sub-detection electrode CEA overlaps the scanning lines G1, G2, and G3, the signal line S2 and S5, and the drive signal supply wire TL2, but does not overlap the pixel electrodes PE1, PE2, and PE3, the signal lines S1, S3, S4, and S6, the drive signal supply wires TL1 and TL2, or the third dummy wire TLD3 in planar view. If no sub-detection electrode CEA is provided between the main detection electrodes CEP disposed side by side in the second direction Y, the slit SPB (refer to FIG. 2) is formed.

The sub-detection electrode CEB extends in the first direction X and electrically couples the main detection electrodes CEP disposed side by side in the first direction X. The slit SPA is formed between the main detection electrodes CEP disposed side by side in the first direction X and the sub-detection electrode CEB. The slit SPA is formed overlapping the signal lines S1 and S4 coupled to the first sub-pixel SPX1 and the drive signal supply wire TL1. If no sub-detection electrode CEB is provided between the main detection electrodes CEP disposed side by side in the first direction X, the slit SPB (refer to FIG. 2) is formed.

The sub-detection electrode CEB overlaps the signal line S1, the drive signal supply wire TL1, and a widened part TC, but does not overlap the pixel electrodes PE1, PE2, and PE3, the scanning line G1, G2, and G3, the signal lines S2 and S3, the drive signal supply wire TL2, or the third dummy wire TLD3 in planar view. Forming the slit SPA can reduce the difference in visibility between the slit SPA and the slit SPB formed between the detection electrodes CE disposed side by side in the first direction X. In addition, forming the slit SPA can reduce parasitic capacitance generated between the detection electrode CE and the drive signal supply wire TL1.

As described above, the detection electrode CE includes the main detection electrode CEP and the sub-detection electrodes CEA and CEB. The main detection electrode CEP has an island shape. The main detection electrodes CEP disposed side by side in the first direction X or the second direction Y are electrically coupled by the sub-detection electrode CEA or CEB. As a result, the detection electrode CE can have a desired area. The main detection electrodes CEP are provided corresponding to the respective pixels PX (the respective first pixels PX1 and the respective second pixels PX2). The slit SPA is formed at a position overlapping the drive signal supply wire TL1 and the signal line S1. The drive signal supply wire TL1 and the first dummy wire TLD1 overlapping the slit SPA are supplied with the same potential as that of the detection electrode CE. With this configuration, the drive signal supply wire TL1 and the first dummy wire TLD1 according to the present embodiment can suppress electric field leakage from the signal lines SL compared with a case where the slit SPA is formed at a position overlapping the second dummy wire TLD2 or the third dummy wire TLD3 in a floating state. Consequently, the present embodiment can suppress deterioration of display quality due to electric field leakage from the signal lines SL.

As illustrated in FIG. 8, the drive signal supply wires TL1 and TL2 overlap the signal lines S1 and S2, respectively, and extend parallel to these signal lines S1 and S2 in planar view. The drive signal supply wires TL1 and TL2 do not overlap the signal line S3. The drive signal supply wires TL1 and TL2 are each provided with the widened part TC. The contact hole CH is formed overlapping the widened part TC.

The third dummy wire TLD3 overlaps the signal line S3 and extends parallel to the signal line S3 in planar view. The third dummy wire TLD3 has slits SPL corresponding to the respective pixels PX arrayed in the second direction Y. The dummy contact hole CHD is formed overlapping the slit SPL. In other words, the third dummy wires TLD3 are arrayed in a manner separated from one another in the second direction Y. The dummy contact hole CHD overlaps the signal line S3 and is formed between the third dummy wires TLD3 disposed side by side in the second direction Y. The slit SPL and the dummy contact hole CHD are formed side by side with the widened part TC and the contact hole CH in the first direction X. The dummy contact hole CHD is formed on the signal line S3 disposed side by side with the pixel electrode PE3 (third sub-pixel SPX3) but is not formed on the signal line S3 disposed side by side with the pixel electrode PE4 (fourth sub-pixel SPX4).

Figure 15:
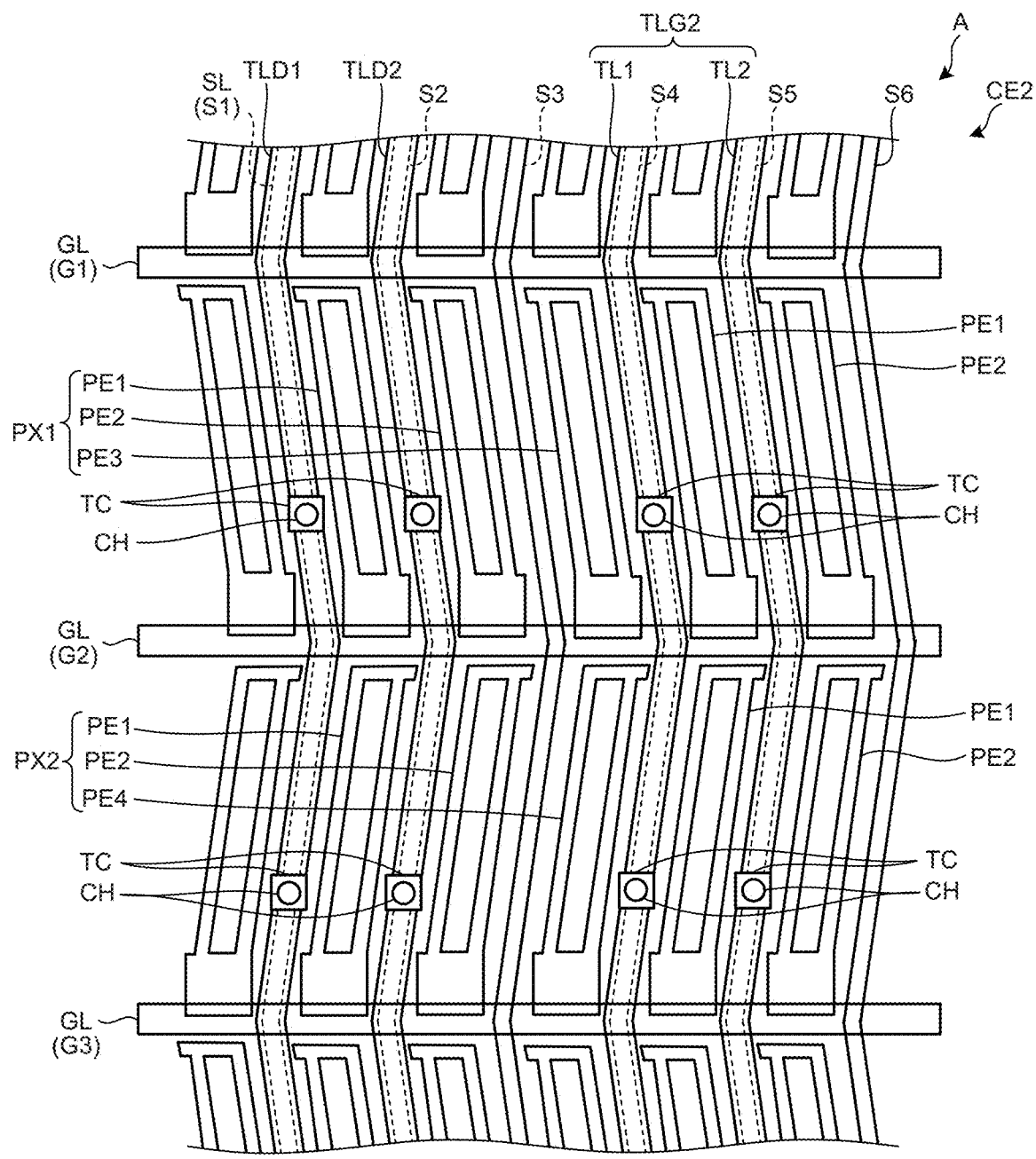
FIG. 15 is a plan view for explaining the drive signal supply wires and the dummy wires in a schematic plan view of the pixels according to the third embodiment.

Similarly to the drive signal supply wires TL1 and TL2, the first dummy wire TLD1 and the second dummy wire TLD2 illustrated in FIG. 6 overlap the signal lines S1 and S2, respectively, and extend parallel to these signal lines S1 and S2. The first dummy wire TLD1 and the second dummy wire TLD2 are illustrated in FIG. 15, which will be described later.

As described above, the drive signal supply wires TL1 and TL2 are provided overlapping the signal lines S1 and S2, respectively, and not overlapping the signal line S3. The third dummy wire TLD3 is provided overlapping the signal line S3 in a floating state. With this configuration, the present embodiment can effectively reduce the parasitic capacitance Csc (refer to FIG. 4) formed in the signal line S3 (third signal line) coupled to the third sub-pixel SPX3 and the fourth sub-pixel SPX4 compared with a configuration where the drive signal supply wire TL is provided overlapping the signal line S3.

More specifically, in the configuration where the drive signal supply wire TL is provided overlapping the signal line S3, the parasitic capacitance Csc formed in the signal line S3 includes the capacitance formed between the signal line S3 and the drive signal supply wire TL. In the configuration according to the present embodiment, the third dummy wire TLD3 in a floating state is provided overlapping the signal line S3. In this configuration, the parasitic capacitance Csc formed in the signal line S3 includes the total of the capacitance formed between the signal line S3 and the third dummy wire TLD3 and the capacitance formed between the third dummy wire TLD3 and the detection electrode CE coupled in series. Providing the third dummy wire TLD3 can reduce the parasitic capacitance Csc. As a result, the display device PNL according to the present embodiment can reduce the time constant of the detection electrode CE and the drive signal supply wire TL and reduce the potential difference of the crosstalk component. Consequently, the present embodiment can suppress deterioration of display quality.

As illustrated in FIG. 9, the array substrate SUB1 includes the translucent first insulating substrate 10, such as a glass substrate and a resin substrate, serving as a base. The array substrate SUB1 includes insulating films 11, 12, and 13, a first organic insulating film 14 (first insulating film), a second organic insulating film 15 (second insulating film), an insulating film 16, the signal lines S1, S2, and S3, the pixel electrodes PE1, PE2, and PE3, the detection electrode CE, a first orientation film AL1, and other components on the side of the first insulating substrate 10 facing the counter substrate SUB2. In the following description, a direction from the array substrate SUB1 to the counter substrate SUB2 is referred to as above or simply referred to as on.

The insulating film 11 is positioned on the first insulating substrate 10. The insulating film 12 is positioned on the insulating film 11. The insulating film 13 is positioned on the insulating film 12. The signal lines S1, S2, and S3 are positioned on the insulating film 13. The first organic insulating film 14 is positioned on the insulating film 13 and covers the signal lines S1, S2, and S3.

The drive signal supply wires TL1 and TL2 and the third dummy wire TLD3 are positioned on the first organic insulating film 14. The drive signal supply wires TL1 and TL2 and the third dummy wire TLD3 are made of a metal material including any one of Al, Mo, and W. The drive signal supply wires TL1 and TL2 and the third dummy wire TLD3 have lower resistance than the detection electrode CE and are electrically conductive. The drive signal supply wires TL1 and TL2 and the third dummy wire TLD3 face the signal lines S1, S2, and S3, respectively, with the first organic insulating film 14 interposed therebetween. In other words, the drive signal supply wires TL1 and TL2 and the third dummy wire TLD3 overlap the signal lines S1, S2, and S3, respectively.

The first dummy wire TLD1 and the second dummy wire TLD2, which are not illustrated in FIG. 9, are also positioned in the same layer as that of the third dummy wire TLD3 on the first organic insulating film 14. The first dummy wire TLD1 and the second dummy wire TLD2 face the signal lines S1 and S2, respectively, with the first organic insulating film 14 interposed therebetween.

The second organic insulating film 15 is provided on the first organic insulating film 14. The drive signal supply wires TL1 and TL2 and the third dummy wire TLD3 are covered with the second organic insulating film 15. The insulating films 11, 12, and 13 and the insulating film 16 are made of a translucent inorganic material, such as silicon oxide or silicon nitride. The first organic insulating film 14 and the second organic insulating film 15 are made of a translucent resin material, such as acrylic resin, and have a thickness larger than that of the other insulating films made of an inorganic material. The thickness of the first organic insulating film 14 is 2 μm to 3 μm, for example. The thickness of the second organic insulating film 15 is 1 μm to 2 μm. The first organic insulating film 14 is thicker than the second organic insulating film 15.

The detection electrode CE is positioned on the second organic insulating film 15. In FIG. 9, the detection electrode CE faces the drive signal supply wires TL1 and TL2 with the second organic insulating film 15 interposed therebetween. The slit SPA between the detection electrodes CE is positioned right above the drive signal supply wire TL1. The detection electrode CE is covered with the insulating film 16.

The pixel electrodes PE are positioned on the insulating film 16 and face the detection electrode CE with the insulating film 16 interposed therebetween. The pixel electrodes PE and the detection electrodes CE are made of a translucent conductive material, such as ITO and indium zinc oxide (IZO). The pixel electrodes PE are covered with the first orientation film AL1. The first orientation film AL1 also covers the insulating film 16.

The counter substrate SUB2 includes a translucent second insulating substrate 20, such as a glass substrate and a resin substrate, serving as a base. The counter substrate SUB2 includes a light-shielding layer BM, color filters CFR, CFG, and CFB, an overcoat layer OC, a second orientation film AL2, and other components on the side of the second insulating substrate 20 facing the array substrate SUB1.

As illustrated in FIG. 9, the light-shielding layer BM is positioned on the side of the second insulating substrate 20 facing the array substrate SUB1. The light-shielding layer BM defines openings facing the pixel electrodes PE1, PE2, and PE3. The light-shielding layer BM is made of a black resin material or a light-shielding metal material.

The color filters CFR, CFG, and CFB are positioned on the side of the second insulating substrate 20 facing the array substrate SUB1. Ends of the color filters CFR, CFG, and CFB overlap the light-shielding layer BM. The color filter CFR faces the pixel electrode PE1. The color filter CFG faces the pixel electrode PE2. The color filter CFB faces the pixel electrode PE3. The color filters CFR, CFG, and CFB are made of resin materials in red, green, and blue, respectively, for example.

The overcoat layer OC covers the color filters CFR, CFG, and CFB. The overcoat layer OC is made of a translucent resin material. The second orientation film AL2 covers the overcoat layer OC. The first orientation film AL1 and the second orientation film AL2 are made of a horizontally oriented material, for example.

The light-shielding layer BM may be formed between any one of the color filters CFR, CFG, and CFB and the overcoat layer OC. Alternatively, the light-shielding layer BM may be formed between the overcoat layer OC and the second orientation film AL2.

As described above, the counter substrate SUB2 includes the light-shieling layer BM, the color filters CFR, CFG, and CFB, and other components. The light-shielding layer BM is disposed in a region facing the wiring, such as the scanning lines G1, G2, and G3, the signal lines S1, S2, and S3, the contact parts PA, and the switching elements Tr illustrated in FIG. 4.

While the counter substrate SUB2 includes the color filters CFR, CFG, and CFB in three colors in FIG. 9, it may include color filters in four or more colors different from blue, red, and green, such as white, transparent, yellow, magenta, and cyan. The color filters CFR, CFG, and CFB may be provided to the array substrate SUB1.

The array substrate SUB1 and the counter substrate SUB2 are disposed with the first orientation film AL1 and the second orientation film AL2 facing each other. The liquid crystal layer LC is sealed between the first orientation film AL1 and the second orientation film AL2. The liquid crystal layer LC is made of a negative liquid crystal material having negative dielectric anisotropy or a positive liquid crystal material having positive dielectric anisotropy.

The array substrate SUB1 faces a backlight unit IL, and the counter substrate SUB2 is positioned on the display surface side. The backlight unit IL may have various kinds of forms, and detailed explanation of the configuration of the backlight unit IL is omitted.

A first optical element OD1 including a first polarizing plate PL1 is disposed on the outer surface of the first insulating substrate 10 or the surface facing the backlight unit IL. A second optical element OD2 including a second polarizing plate PL2 is disposed on the outer surface of the second insulating substrate 20 or the surface on the observation position side. A first polarization axis of the first polarizing plate PL1 and a second polarization axis of the second polarizing plate PL2 are in a cross-Nicol positional relation on the X-Y plane, for example. The first optical element OD1 and the second optical element OD2 may include other optical functional elements, such as a phase-contrast plate.

Let us assume a case where the liquid crystal layer LC is made of a negative liquid crystal material, for example. When no voltage is applied to the liquid crystal layer LC, liquid crystal molecules LM are initially oriented with their long axes extending along the first direction X on the X-Y plane. By contrast, when a voltage is applied to the liquid crystal layer LC, that is, in an on-state when an electric field is formed between the pixel electrodes PE and the detection electrodes CE, the orientation state of the liquid crystal molecules LM changes because of the effects of the electric field. In the on-state, the polarization state of incident linearly polarized light changes depending on the orientation state of the liquid crystal molecules LM when passing through the liquid crystal layer LC.

The following describes the configuration of the switching elements Tr1, Tr2, and Tr3 illustrated in FIG. 10 in greater detail. While the switching elements Tr1, Tr2, and Tr3 described below are top-gate elements, they may be bottom-gate elements. FIG. 10 illustrates only major parts required for the explanation of the switching elements Tr1, Tr2, and Tr3 and does not illustrate the detection electrodes CE, the pixel electrodes PE1, PE2, and PE3, the drive signal supply wires TL1 and TL2, or other components.

The switching elements Tr1, Tr2, and Tr3 are disposed side by side in the first direction X. The switching element Tr1 includes a semiconductor layer SC1. The switching element Tr2 includes a semiconductor layer SC2. The switching element Tr3 includes a semiconductor layer SC3. The semiconductor layers SC1, SC2, and SC3 each have a substantially U-shape and intersect the scanning line G2 at two points. While the following describes the switching element Tr1, the explanation of the switching element Tr1 is also applicable to the switching elements Tr2 and Tr3.

In the switching element Tr1, the semiconductor layer SC1 has a first part E11 provided at one end and a second part E12 provided at the other end. The first part E11 is electrically coupled to the signal line S1 through a contact hole CH11. The second part E12 is electrically coupled to the pixel electrode PE1 (refer to FIG. 8) through a contact hole CH12.

The two parts of the scanning line G2 intersecting the semiconductor layer SC1 serve as gate electrodes WG11 and WG12.

In the configuration according to the present embodiment, the pixel electrode PE of each sub-pixel SPX is electrically coupled to the signal line SL positioned on the left of the pixel electrode PE via the switching element Tr as illustrated in FIGS. 8 and 10. The signal lines S1 and S4 (first signal line) coupled to the first sub-pixel SPX1 are each disposed at a boundary between the pixels PX each composed of three sub-pixels SPX.

Figure 11:
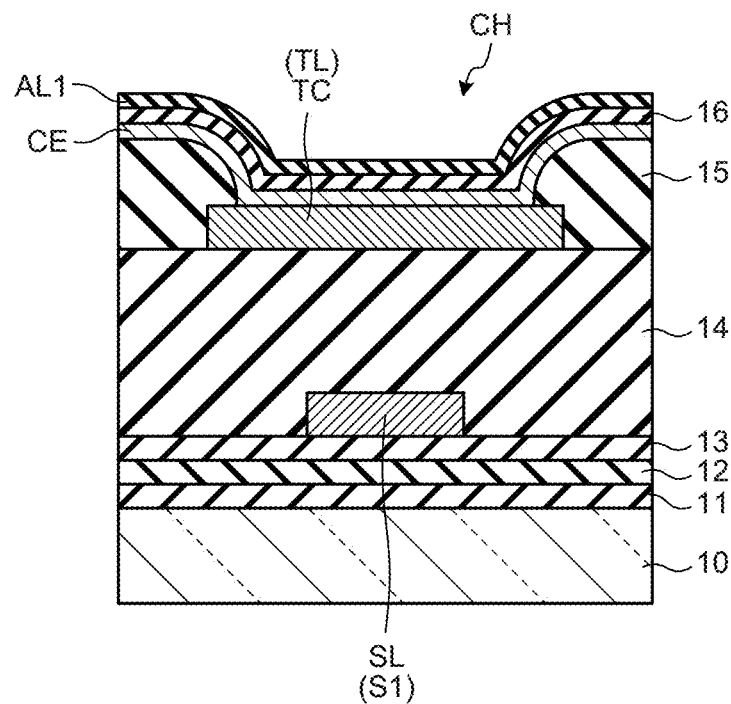
FIG. 11 is a sectional view for explaining a contact hole.
Figure 12:
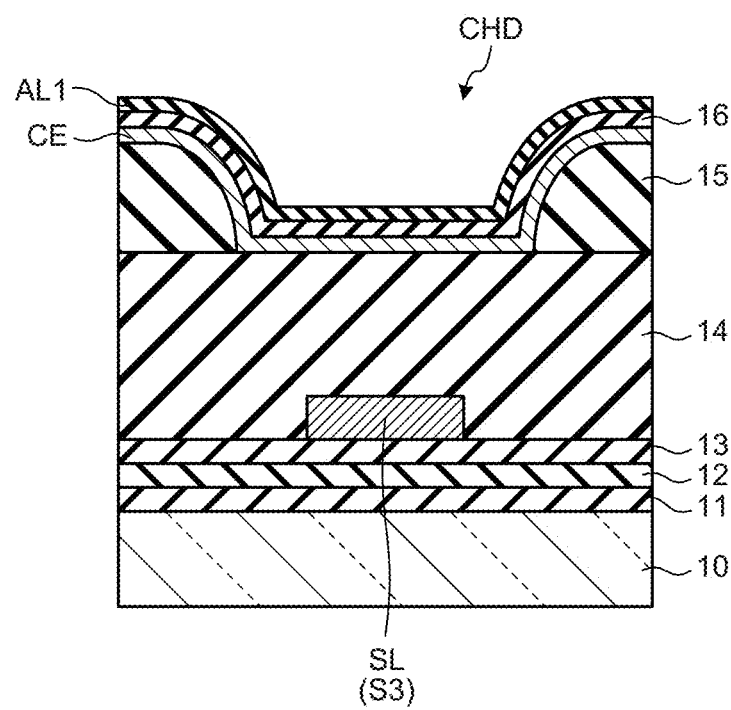
FIG. 12 is a sectional view for explaining a dummy contact hole.

The following describes a sectional configuration of the contact hole CH and the dummy contact hole CHD. FIG. 11 is a sectional view for explaining the contact hole. FIG. 12 is a sectional view for explaining the dummy contact hole.

As illustrated in FIG. 11, the first organic insulating film 14, the drive signal supply wire TL, and the second organic insulating film 15 are layered in order on the signal line SL. In other words, the drive signal supply wire TL is provided between the first organic insulating film 14 and the second organic insulating film 15. The second organic insulating film 15 has the contact hole CH at a position overlapping the widened part TC of the drive signal supply wire TL. The contact hole CH is formed by passing through the second organic insulating film 15, and the bottom surface of the contact hole CH is the widened part TC of the drive signal supply wire TL. The detection electrode CE is provided on the second organic insulating film 15 and is in contact with the widened part TC of the drive signal supply wire TL on the bottom surface of the contact hole CH. As described above, the drive signal supply wire TL is coupled to the detection electrode CE through the contact hole CH formed in the second organic insulating film 15 in a region overlapping the signal line SL (signal line S1). The first orientation film AL1 covers the insulating film 16 and is present in the contact hole CH.

FIG. 11 illustrates the sectional configuration of the coupling part of the detection electrode CE and the drive signal supply wire TL. The contact hole CH that couples the detection electrode CE and the first dummy wire TLD1 has the same sectional configuration as that illustrated in FIG. 11.

As illustrated in FIG. 12, the third dummy wire TLD3 is not provided on the first organic insulating film 14 in the region where the dummy contact hole CHD is formed. As described above, the dummy contact hole CHD is formed in the region where the slit SPL (refer to FIG. 8) is formed in the third dummy wire TLD3. The dummy contact hole CHD is formed by passing through the second organic insulating film 15 in a region overlapping the signal line S3, and the bottom surface of the dummy contact hole CHD is the first organic insulating film 14. The detection electrode CE is provided on the second organic insulating film 15 and is in contact with the first organic insulating film 14 on the bottom surface of the dummy contact hole CHD. In other words, the detection electrode CE is formed by covering the dummy contact hole CHD and is not coupled to metal wiring, such as the third dummy wire TLD3. The first orientation film AL1 covers the insulating film 16 and is present in the dummy contact hole CHD. Forming the dummy contact hole CHD prevents the first orientation film AL1 from being unevenly applied in the display region DA, thereby making the film thickness of the first orientation film AL1 uniform.

As described above, the display device PNL according to the present embodiment includes a plurality of first sub-pixels SPX1, a plurality of second sub-pixels SPX2, a plurality of third sub-pixels SPX3, a plurality of fourth sub-pixels SPX4, a first signal line (signal line S1), a second signal line (signal line S2), a third signal line (signal line S3), a plurality of detection electrodes CE, and a plurality of drive signal supply wires TL. The first sub-pixels SPX1 display red. The second sub-pixels SPX2 display green. The third sub-pixels SPX3 display blue. The fourth sub-pixels SPX4 display white. The first signal line is coupled to the first sub-pixels SPX1. The second signal line is coupled to the second sub-pixels SPX2. The third signal line is coupled to the third sub-pixels SPX3 and the fourth sub-pixels SPX4. The detection electrodes CE are arrayed in a matrix (row-column configuration) and are each provided overlapping the first sub-pixels SPX1, the second sub-pixels SPX2, the third sub-pixels SPX3, and the fourth sub-pixels SPX4. The drive signal supply wires TL are coupled to the respective detection electrodes CE and supply drive signals to the respective detection electrodes CE. The drive signal supply wire TL is provided overlapping at least one of the first signal line and the second signal line and not overlapping the third signal line.

The display device PNL further includes the first dummy wire TLD1 and the second dummy wire TLD2. The first dummy wire TLD1 is provided overlapping the first signal line. The second dummy wire TLD2 is provided overlapping the second signal line. The first signal line, the second signal line, and the third signal line are arrayed side by side in the first direction X. At least one of the first dummy wire TLD1 and the second dummy wire TLD2 is disposed side by side with the drive signal supply wire TL in the second direction Y intersecting the first direction X. The display device PNL further includes the third dummy wire TLD3 that is provided overlapping the third signal line, is not coupled to the detection electrode CE, and is in a floating state.

With this configuration, the present embodiment can effectively reduce the parasitic capacitance Csc (refer to FIG. 4) formed in the third signal line coupled to the third sub-pixel SPX3 and the fourth sub-pixel SPX4 compared with a configuration where the drive signal supply wire TL is provided overlapping the signal line S3. As a result, the present embodiment can reduce the time constant of the detection electrode CE and the drive signal supply wire TL and reduce the difference in voltage of the crosstalk component. Consequently, the present embodiment can suppress deterioration of display quality.

Second Embodiment

Figure 13:
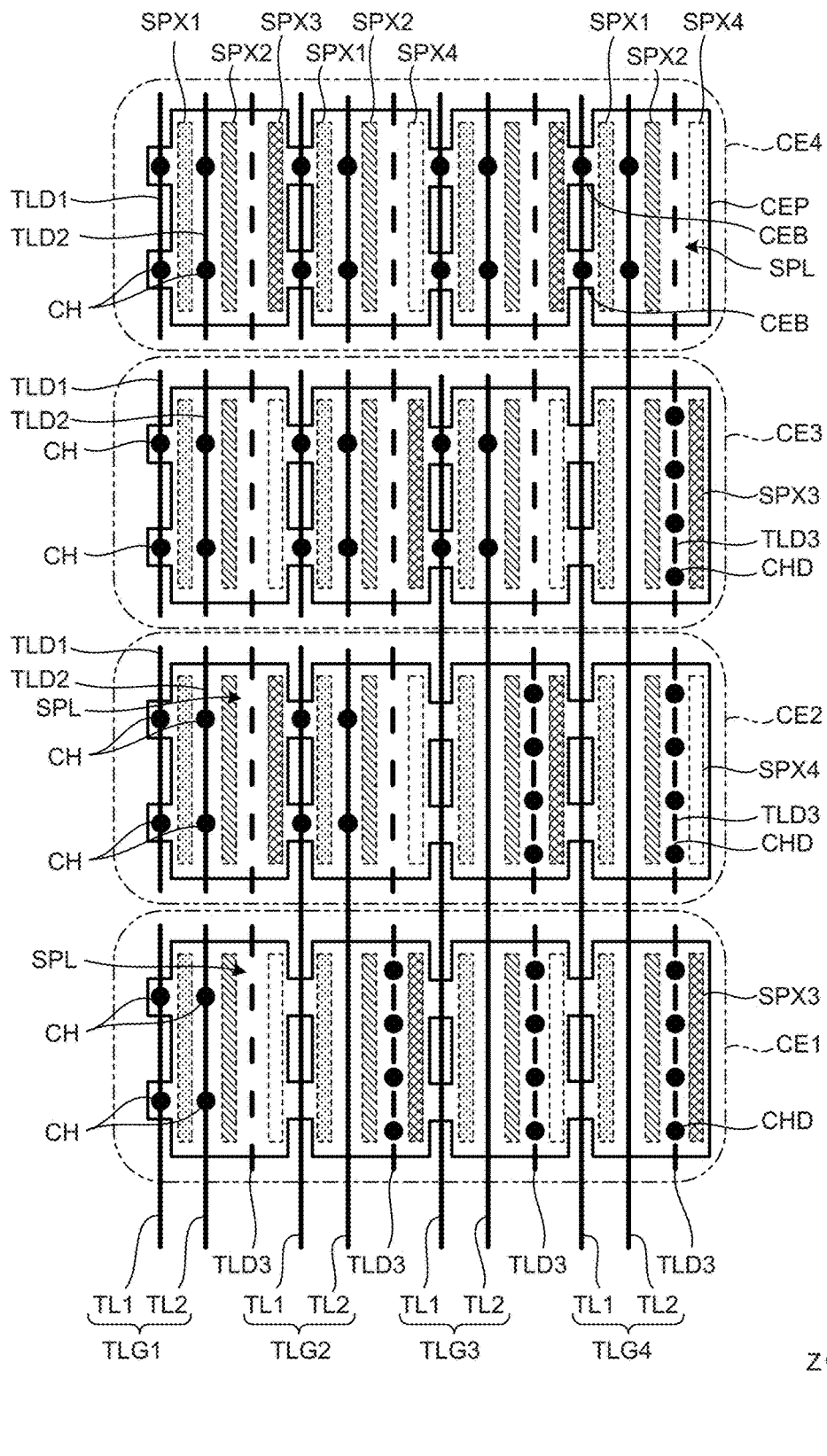
FIG. 13 is a plan view for explaining the display device according to a second embodiment.

FIG. 13 is a plan view for explaining the display device according to a second embodiment. In the following description, the same components as those according to the embodiment above are denoted by like reference numerals, and overlapping explanation thereof is omitted.

While the configuration that the second dummy wire TLD2 according to the first embodiment is in a floating state is described, the present disclosure is not limited thereto. As illustrated in FIG. 13, the second dummy wire TLD2 according to the second embodiment is electrically coupled to the detection electrode CE through the contact holes CH. In other words, the first dummy wire TLD1 and the second dummy wire TLD2 are electrically coupled to the detection electrode CE, and the third dummy wire TLD3 is in a floating state. The number of contact holes CH formed for the second dummy wire TLD2 is equal to that of contact holes CH formed for the drive signal supply wire TL2. The number of contact holes CH formed for the second dummy wire TLD2 is equal to that of contact holes CH formed for the first dummy wire TLD1.

The present embodiment is different from the first embodiment above in that no dummy contact hole CHD is formed for the third dummy wire TLD3 disposed side by side with the first dummy wire TLD1 and the second dummy wire TLD2. Let us focus on the detection electrode CE2, for example. No dummy contact hole CHD is formed for the third dummy wire TLD3 disposed side by side with the first dummy wire TLD1 and the second dummy wire TLD2. No dummy contact hole CHD is formed for the third dummy wire TLD3 disposed side by side with the drive signal supply wires TL1 and TL2 of the wiring group TLG2. In the sub-pixel columns overlapping the wiring groups TLG3 and TLG4 and where no contact hole CH is formed, four dummy contact holes CHD are formed for the third dummy wire TLD3 disposed side by side with the drive signal supply wires TL1 and TL2.

In the configuration according to the present embodiment, the parasitic capacitance in the signal line S2 increases compared with the case where the second dummy wire TLD2 is in a floating state. Also in this case, the third dummy wire TLD3 is in a floating state, and the present embodiment can reduce the parasitic capacitance Csc in the signal line S3 coupled to the third sub-pixel SPX3 and the fourth sub-pixel SPX4. In addition, the present embodiment can share the same arrangement pattern for the contact holes CH for the drive signal supply wires TL1 and TL2 and the contact holes CH for the first dummy wire TLD1 and the second dummy wire TLD2.

Third Embodiment

Figure 14:
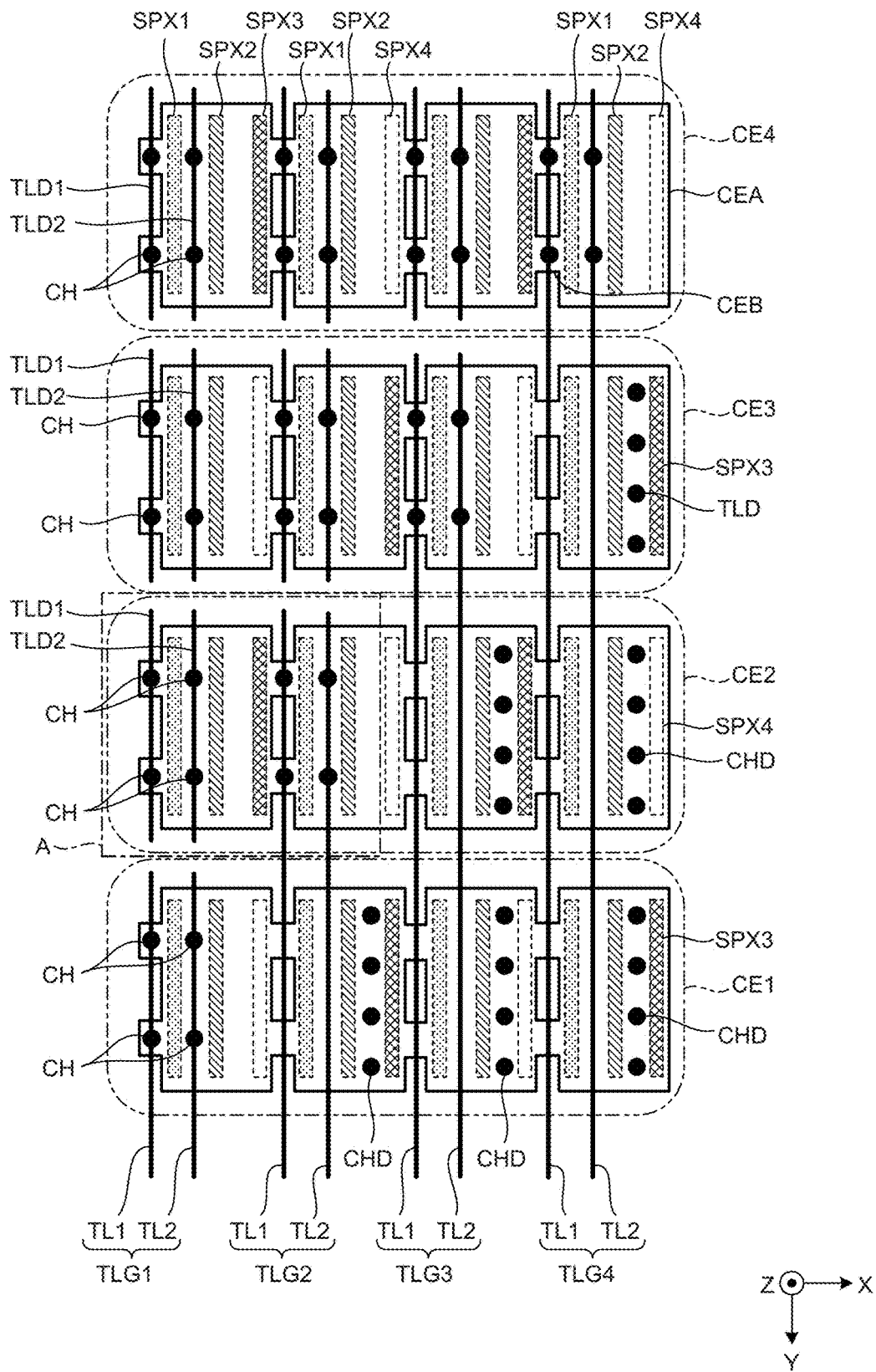
FIG. 14 is a plan view for explaining the display device according to a third embodiment.

FIG. 14 is a plan view for explaining the display device according to a third embodiment. FIG. 15 is a plan view for explaining the drive signal supply wires and the dummy wires in a schematic plan view of the pixels according to the third embodiment. FIG. 15 is an enlarged plan view of part of the region A illustrated in FIG. 14.

As illustrated in FIGS. 14 and 15, the present embodiment is different from the first and the second embodiments above in that no third dummy wire TLD3 is provided. In other words, the metal wiring including the drive signal supply wires TL1 and TL2, the first dummy wire TLD1, and the second dummy wire TLD2 does not overlap the signal line S3 (third signal line). The first dummy wire TLD1 and the second dummy wire TLD2 overlap the signal lines S1 and S2, respectively, and extend parallel to these signal lines S1 and S2. The first dummy wire TLD1 and the second dummy wire TLD2 are electrically coupled to the detection electrode CE through the contact holes CH.

As illustrated in FIG. 14, the pixels PX having no contact hole CH have the dummy contact holes CHD. Let us focus on the detection electrode CE2, for example. No dummy contact hole CHD is formed for the sub-pixel SPX disposed side by side with the first dummy wire TLD1 and the second dummy wire TLD2. No dummy contact hole CHD is formed for the sub-pixel SPX disposed side by side with the drive signal supply wires TL1 and TL2 of the wiring group TLG2. In the sub-pixel columns overlapping the wiring groups TLG3 and TLG4 and where no contact hole CH is formed, four dummy contact holes CHD are formed for the sub-pixel SPX disposed side by side with the drive signal supply wires TL1 and TL2. With this configuration, the present embodiment can suppress variations in the number of contact holes CH and dummy contact holes CHD.

The present embodiment includes no third dummy wire TLD3 overlapping the signal line S3. The parasitic capacitance Csc formed in the signal line S3 includes the capacitance formed between the signal line S3 and the detection electrode CE. With this configuration, the present embodiment can make the distance between the signal line S3 and the detection electrode CE longer than that between the signal line S3 and the drive signal supply wire TL if the drive signal supply wire TL is provided overlapping the signal line S3. As a result, the present embodiment can reduce the parasitic capacitance Csc formed in the signal line S3.

While the configuration that the second dummy wire TLD2 is electrically coupled to the detection electrode CE through the contact holes CH is described, the present embodiment is not limited thereto. The second dummy wire TLD2 may be in a floating state as described in the first embodiment. In the sub-pixel SPX disposed side by side with the first dummy wire TLD1 and the second dummy wire TLD2, the dummy contact holes CHD may be formed overlapping the signal line S3 as needed.

Fourth Embodiment

Figure 16:
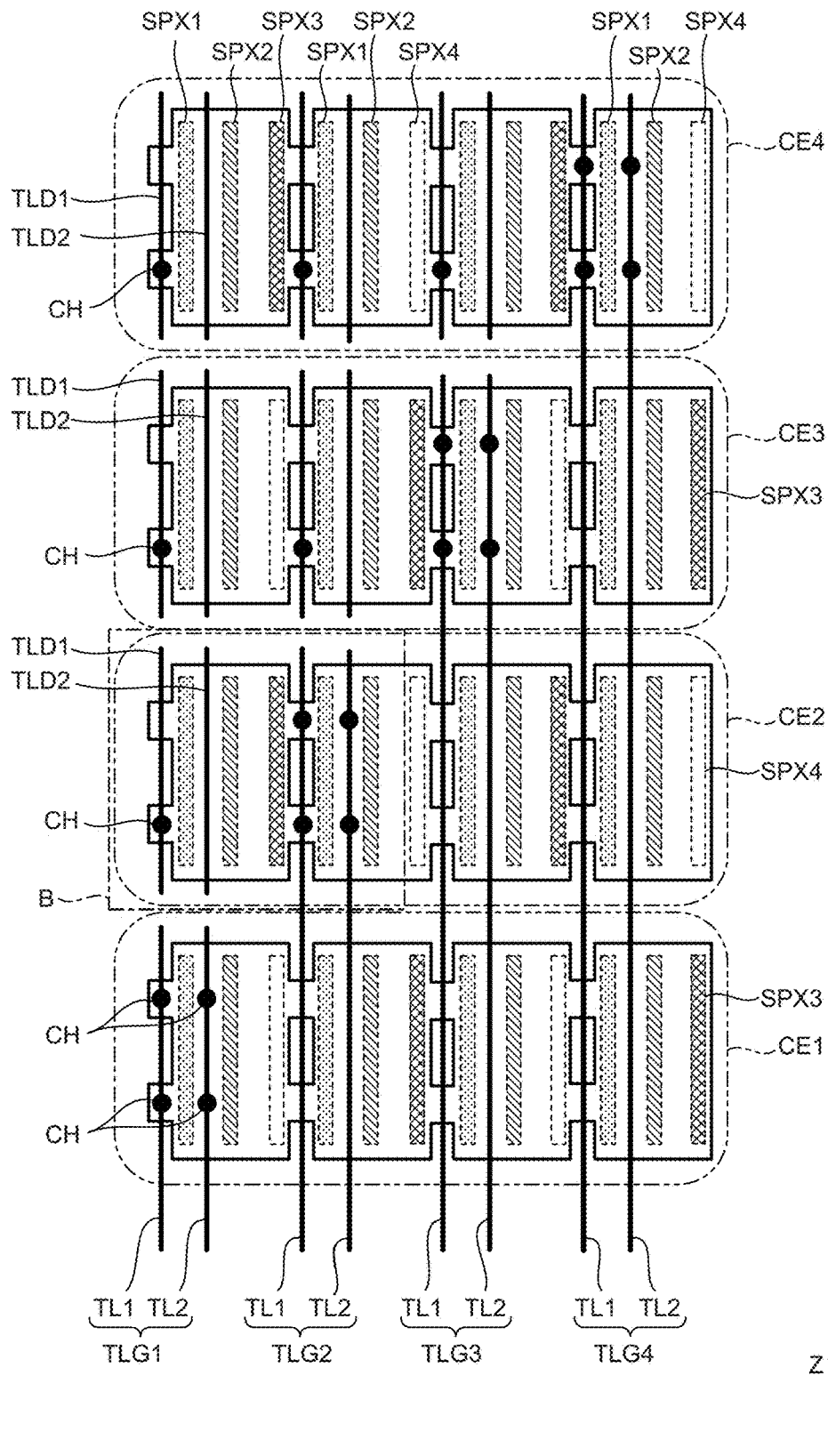
FIG. 16 is a plan view for explaining the display device according to a fourth embodiment.
Figure 17:
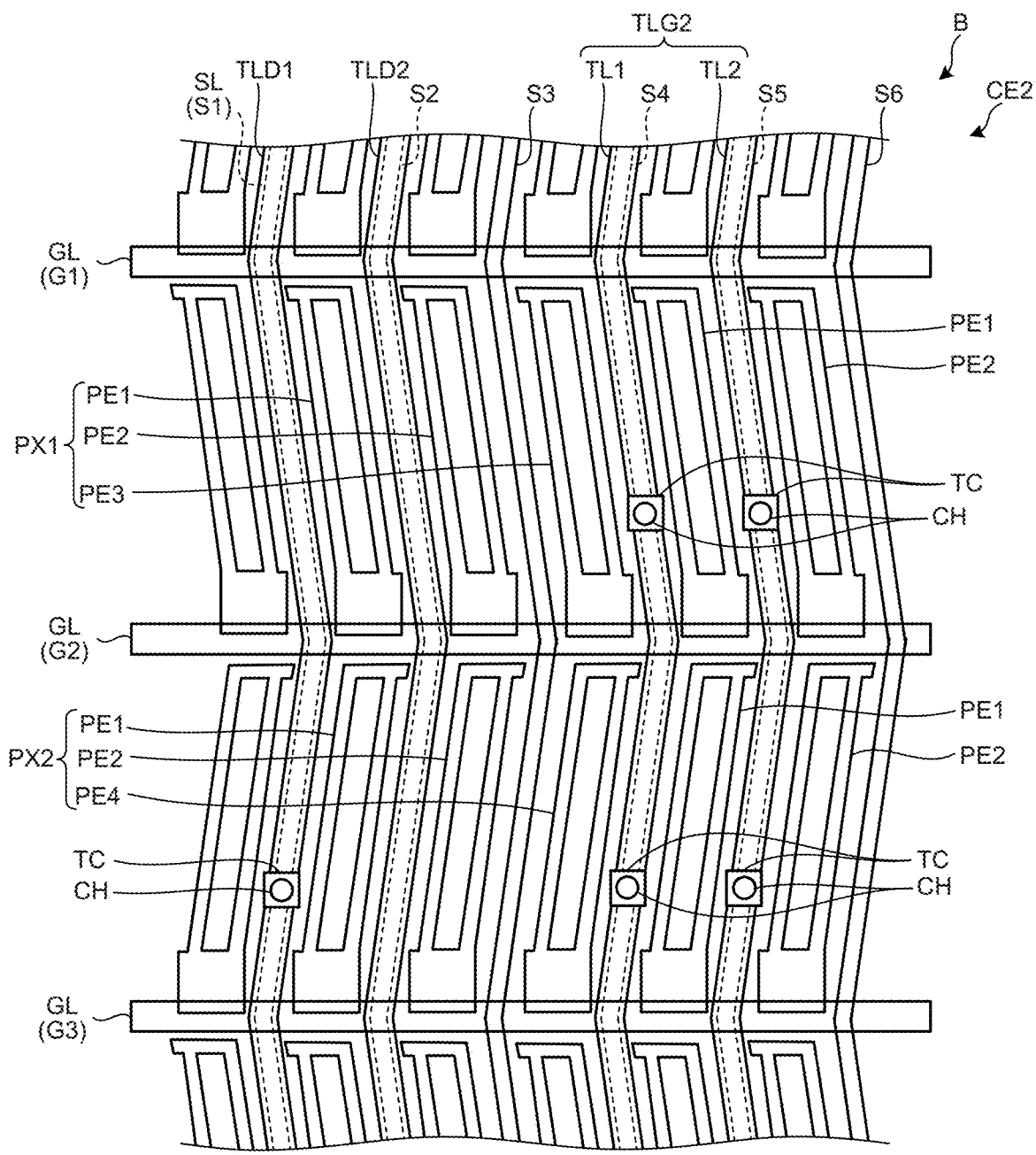
FIG. 17 is a plan view for explaining the drive signal supply wires and the dummy wires in a schematic plan view of the pixels according to the fourth embodiment.

FIG. 16 is a plan view for explaining the display device according to a fourth embodiment. FIG. 17 is a plan view for explaining the drive signal supply wires and the dummy wires in a schematic plan view of the pixels according to the fourth embodiment. FIG. 17 is an enlarged plan view of part of the region A illustrated in FIG. 16. As illustrated in FIGS. 16 and 17, the present embodiment is different from the embodiments above in that the number of contact holes CH formed for one drive signal supply wire TL1 is different from that of contact holes CH formed for one first dummy wire TLD1. Two contact holes CH are formed for one drive signal supply wire TL1, and one contact hole CH is formed for one first dummy wire TLD1, for example. No contact hole CH is formed for the second dummy wire TLD2, and the second dummy wire TLD2 is in a floating state. In other words, the first dummy wire TLD1 according to the present embodiment is electrically coupled to the detection electrode CE, and the second dummy wire TLD2 is in a floating state.

The present embodiment includes neither the third dummy wire TLD3 nor the dummy contact hole CHD. In other words, the metal wiring including the drive signal supply wires TL1 and TL2, the first dummy wire TLD1, and the second dummy wire TLD2 does not overlap the signal line S3 (third signal line). The dummy contact hole CHD does not overlap the signal line S3 (third signal line).

With this configuration, the present embodiment can reduce the number of contact holes CH and dummy contact holes CHD compared with the first to the third embodiments. The present embodiment can suppress unevenness in the film thickness of the first organic insulating film 14 and the second organic insulating film 15 (refer to FIG. 9) between the signal line SL and the detection electrode CE. As a result, the present embodiment can secure the distance between the signal line S3 and the detection electrode CE if no third dummy wire TLD3 is provided. Consequently, the present embodiment can reduce the parasitic capacitance Csc formed in the signal line S3.

While one contact hole CH is formed for one first dummy wire TLD1 in FIG. 16, this configuration is given by way of example only and may be appropriately changed. The number of contact holes CH formed for one first dummy wire TLD1 simply needs to be smaller than that of contact holes CH formed for one drive signal supply wire TL1 and may be two or more, for example. The second dummy wire TLD2 is not limited to be in a floating state, and one or a plurality of contact holes CH may be formed for the second dummy wire TLD2.

The configurations according to the first to the fourth embodiments may be appropriately changed, and part of the configurations may be appropriately combined. The first and the second embodiments, for example, may include the third dummy wires TLD3 with no dummy contact hole CHD.

While exemplary embodiments of the present disclosure have been described, the embodiments are not intended to limit the present disclosure. The contents disclosed in the embodiments are given by way of example only, and various modifications may be made without departing from the spirit of the present disclosure. Appropriate modifications made without departing from the spirit of the present disclosure naturally fall within the technical scope of the disclosure.

What is claimed is:

1. A display device comprising:
a first sub-pixel configured to display a first color, a second sub-pixel configured to display a second color different from the first color, and a third sub-pixel configured to display a third color different from the first and second colors in a display area;
a first signal line coupled to the first sub-pixel, a second signal line coupled to the second sub-pixel, and a third signal line coupled to the third sub-pixel;
a plurality of detection electrodes arrayed in a matrix in the display area, the detection electrodes including a first detection electrode;
a plurality of signal supply wires including a first signal supply wire and a second signal supply wire; and
a plurality of slits formed overlapping the first signal supply line between the detection electrodes disposed side by side in a first direction,
wherein
the slits including a first slit, a second slit, and a third slit placed between the first and second slits,
the first, second, and third slits are formed in the first detection electrode, and
a length of the third slit is different from a length of the first slit and a length of the second slit.

2. The display device of claim 1, wherein the length of the first slit is the same as the length of the second slit.

3. The display device of claim 1, wherein
the detection electrodes overlap the signal supply wires,
one of the signal supply wires has a first portion and a second portion,
the first portion is in contact with one of the detection electrodes, and
the second portion is not in contact with the detection electrodes.

4. The display device of claim 1, wherein
the length of the third slit is longer than a length of a portion between the first slit and the third slit, and
the length of the third slit is longer than a length of a portion between the second slit and the third slit.

5. The display device of claim 1, wherein
the first signal supply wire overlaps the first signal line and is coupled to the first detection electrode,
the second signal supply wire overlaps the second signal line and is coupled to the first detection electrode, and
none of the signal supply wires overlap the third signal line in the display area.

6. The display device of claim 1, further comprising a dummy wire overlapping the first detection electrode, wherein
the dummy wire overlaps the third signal line, and
the dummy wire is not coupled to the first detection electrode and is in a floating state.

7. The display device of claim 6, wherein
the dummy wire includes a first portion and a second portion,
the first portion and the second portion are arrayed in a manner separated from one another,
the first portion overlaps the first detection electrode and the third signal line,
the first portion is not coupled to the first detection electrode and is in a floating state,
the second portion overlaps the first detection electrode and the third signal line, and
the second portion is not coupled to the first detection electrode and is in a floating state.

8. The display device according to claim 7, wherein
the first detection electrode is provided above the first signal supply wire, the second signal supply wire, and the first portion and the second portion of the dummy wire, a first insulating film being disposed between the dummy wire and the first detection electrode,
the first signal supply wire is coupled to the first detection electrode through a first contact hole formed in the first insulating film,
the second signal supply wire is coupled to the first detection electrode through a second contact hole formed in the first insulating film,
a dummy contact hole is formed in the first insulating film, and
the dummy contact hole overlaps the third signal line and is located in a gap between the first portion and the second portion.

9. The display device of claim 8, further comprising a second insulating film, wherein
the first signal supply wire, the second signal supply wire, and the dummy wire are provided between the second insulating film and the first insulating film,
the second insulating film is exposed from the dummy contact hole, and
the first detection electrode is in contact with the second insulating film in the dummy contact hole.

10. The display device of claim 1, wherein
the first detection electrode is provided above the first signal supply wire and the second signal supply wire with a first insulating film interposed therebetween,
the first signal supply wire is coupled to the first detection electrode through a first contact hole formed in the first insulating film,
the second signal supply wire is coupled to the first detection electrode through a second contact hole formed in the first insulating film, and
a plurality of dummy contact holes are formed in the first insulating film and overlap the third signal line.

11. The display device of claim 10, further comprising a second insulating film,
wherein
the first signal supply wire and the second signal supply wire are provided between the second insulating film and the first insulating film,
the second insulating film is exposed from the dummy contact holes, and
the first detection electrode is in contact with the second insulating film in the dummy contact holes.

12. The display device according to claim 1, wherein
the first color is red,
the second color is green, and
the third color is blue.

* * * * *